(12) United States Patent
Liang et al.

(10) Patent No.: US 11,308,687 B1
(45) Date of Patent: Apr. 19, 2022

(54) SYSTEM AND METHOD OF PROVIDING SIMULATED THREE-DIMENSIONAL OBJECTS

(71) Applicant: Amazon Technologies, Inc., Seattle, WA (US)

(72) Inventors: Nancy Yi Liang, Seattle, WA (US); Matthew Keith Miller, Seattle, WA (US); Gabriel J. Zimmerman, New York, NY (US); Jennifer M. Lin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/370,078

(22) Filed: Mar. 29, 2019

(51) Int. Cl.
*G06T 17/00* (2006.01)
*G06T 13/60* (2011.01)
*G06F 3/0484* (2013.01)
*H04L 29/06* (2006.01)
*G06F 3/04847* (2022.01)
*H04L 67/01* (2022.01)

(52) U.S. Cl.
CPC ............. *G06T 17/00* (2013.01); *G06T 13/60* (2013.01); *G06F 3/04847* (2013.01); *G06T 2200/24* (2013.01); *G06T 2210/16* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 9,501,140 B2 * | 11/2016 | Ovadia Nahon | G06F 8/38 |
| 2013/0016107 A1 * | 1/2013 | Dharmapurikar | G06F 3/1454 345/501 |
| 2014/0213362 A1 * | 7/2014 | Perlman | A63F 13/87 463/31 |
| 2014/0351638 A1 * | 11/2014 | Chang | H04L 1/08 714/18 |
| 2015/0154691 A1 * | 6/2015 | Curry | G06T 13/40 705/27.2 |
| 2019/0213784 A1 * | 7/2019 | Schmalstieg | G06T 15/405 |

* cited by examiner

*Primary Examiner* — Jennifer Mehmood
*Assistant Examiner* — Jed-Justin Imperial
(74) *Attorney, Agent, or Firm* — Knobbe, Martens, Olson & Bear, LLP

(57) ABSTRACT

A device can receive an identification of an environmental model associated with a user navigating a website and receive an identification of an item model associated with an item requested by the user to be shown in connection with the environmental model on a client device. The environmental model could be a body model of the user or of another force like wind. The item model models how the item would move in connection with the environmental model. The device identifies movement associated with the environmental model and generates, based on the environmental model and the item model, frames each having respective data of the item as it would move on the environmental model according to the movement to yield movement key attributes. The device transmits the movement key attributes to the client device for rendering using a client device rendering engine.

20 Claims, 11 Drawing Sheets

SYSTEM AND METHOD OF PROVIDING SIMULATED THREE-DIMENSIONAL OBJECTS

BACKGROUND

This disclosure relates to the dynamic or continuous generation of three-dimensional item movement on a virtual body or in connection with an environment using a physics engine operating on a body model or an environmental model and a clothing model.

BRIEF DESCRIPTION OF THE DRAWINGS

Various embodiments in accordance with the present disclosure will be described with reference to the drawings, in which.

Figure 1:
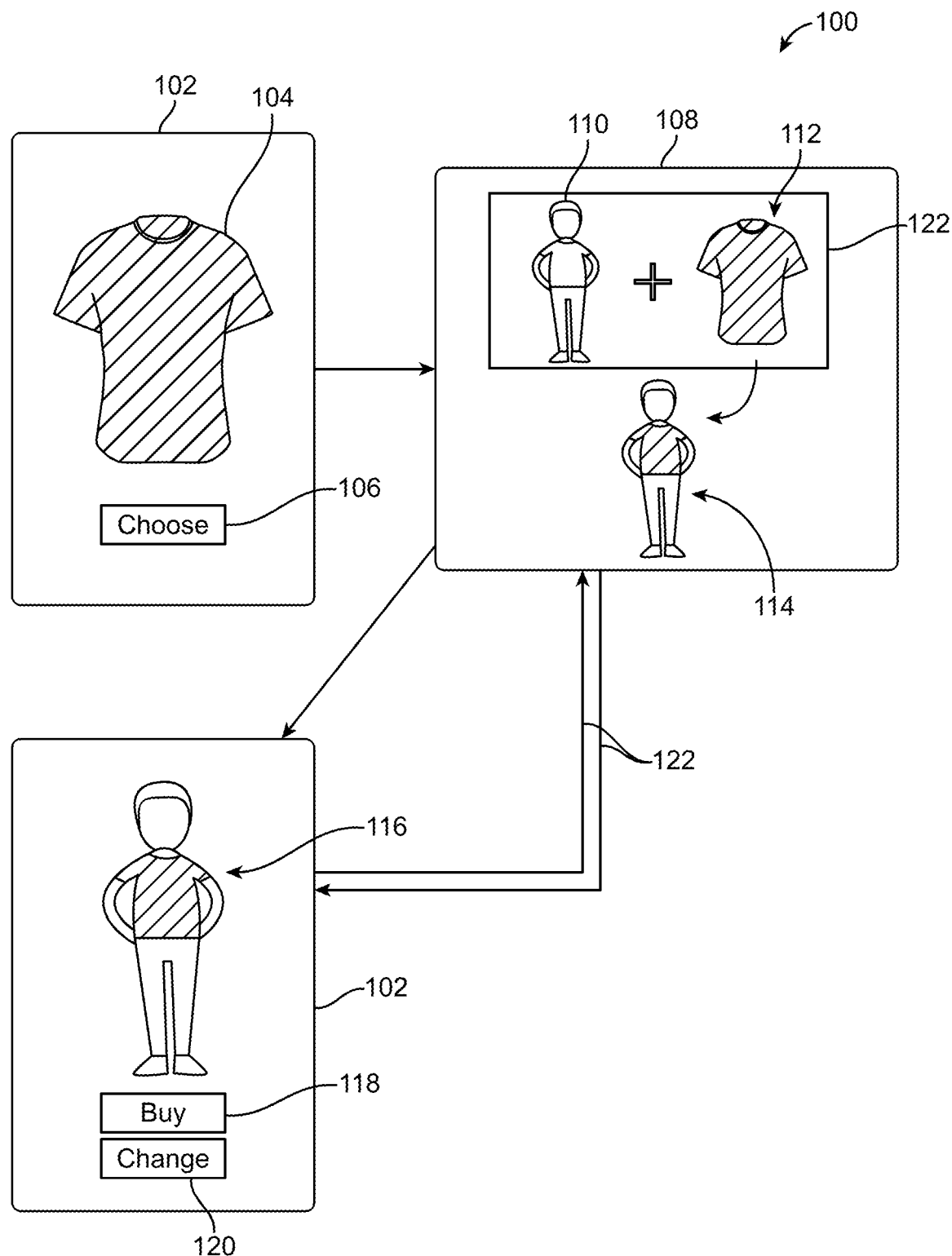
FIG. 1 illustrates an example interface which is applicable to an aspect of this disclosure.

While the disclosed technology is described herein by way of example for several embodiments and illustrative drawings, those skilled in the art will recognize that the disclosed technology is not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the words "can" or "may" are used in a permissive sense (i.e., meaning having the potential to), rather than the mandatory sense (i.e., meaning must). Similarly, the words "include", "including", and "includes" mean including, but not limited to. Any feature from any embodiment or example can be utilized with any other feature from another embodiment or example.

DETAILED DESCRIPTION

This disclosure provides a novel approach to providing a real-time simulation or generation of three-dimensional objects by a physics engine operating on a server device and utilizing an object model and a body model, an environmental model or both. The physics engine can be computer software operating on a hardware device that generates a simulation of a physical system, such as how clothing would look on a body or how the clothing would move in wind, or with other clothing, and so forth. The physics engine can operate in a loop to simulate how an external force such as gravity, a body, wind, moisture, a body having other clothing like a coat, etc., would interact with an object. As used herein, an environmental model can include one or multiple models that can be input to the physics engine. The physics engine operates on an item model or a clothing model to process the physical characteristics of the item as they would react when interacting with other items or forces, such as a human body, or wind, or rain, or other clothing items, and so forth. At each step, the engine determines collisions, movement of cloth, item movement, gravitational forces, wind forces, movement due to the body model characteristics, characteristics of the ground, characteristics of other clothing on a body model, etc. and calculates a velocity and position of each point in a wire-mesh framework modeling the item. An example physics engine is the ReactPhysics3D engine library for simulations and gaming. The present disclosure provides an improvement to a physics engine to take into account the body model, the item model or models, user instructions, and a more real-time or continuous responsive to change requests.

While some of the discussion herein relates to a body model of a human body, all of the concepts can apply generally to an environmental model which can model other forces that might act on an item whether it be clothing or an accessory (such as an umbrella). The environmental model, for example, could be used to model forces interacting with a shirt that the user desires to potentially purchase. The environmental model could be a body model, it could also be wind model that simulates a source location for wind and simulates wind "particles" that impact on an item of clothing at a certain velocity. The environmental model could include moisture or water on clothing, or rain which can include water plus velocity and mass. The environmental model could include a body model wearing pants such that the physics engine would model how the shirt would react in a change request or a movement request by the user such that both the body model and the pants model would be taken into account in modeling how the shirt would look if the body model (wearing the pants) would look if the user ran, or bent over, or lifted their arms.

In each different type of modeling that is contemplated as within the scope of this disclosure, object are modeled at the server physics engine and three-dimensional data is transmitted to a client device for rendering. The following examples focus on a body model scenario.

The objects in one aspect are generated as a series of frames representing the movement of clothing on a body model, and key attributes (such as vertices of a wire-frame mesh of the clothing as that clothing would be worn on a particular body model) of each frame are generated by the physics engine for rendering and viewing on a client device. A website implementing the concepts disclosed herein can transmit, in real-time or on a continuous basis to a client device, three-dimensional data for rendering a particular article of clothing to show how it would fit on their own body and also how the clothing would move as their body moves. The physics engine utilizes a body model for the consumer (or other body model) and a clothing model for the item of clothing in order to generate frames for transmission to a client device for rendering to illustrate the movement.

The present disclosure focuses on several goals. The first goal is to present on a client device, such as a mobile phone or a desktop computer, an item (such as a garment or accessory) and how that item will look on the particular user's body. A body model specific to the characteristics, shape and configuration of the body of the user is applied to a physics engine operating on a server to generate a three-dimensional simulation of the item on the user's body. Users desire to have a strong sense of how an item that they might purchase would look on their body. In particular, users desire to know if there might be issues with respect to how a garment might fit their body in less desirable ways or in specific poses. For example, a shirt might properly cover the user's body while the user is standing, but if the user bends over, the shirt may shift and be revealing in a potentially embarrassing way. The present disclosure provides a novel solution to generate and transmit graphical three-dimensional data to a client device of the user in real-time or near real-time as compute and transmission resources are available. Users can see the renderings as they select items potentially for purchase or as the user request changes such as movement of the body model to see how the clothing reacts.

Another aspect of this disclosure is to provide a broader concept of an environmental model which can enable the physics engine to continuously generate frames to illustrate how clothing or another item might look with a variety of forces acting on the item, such as wind, a body, other clothing, items in a room, and so forth. The environmental model can encompass a plurality of other models for use by the physics engine. A water model, a body model, a clothing model and a wind model could all combine to illustrate how the clothing will react on the body based on these various forces and the physical characteristics of the clothing.

Another benefit of the present disclosure is to enable some on-line experiences to be more enjoyable for users. For example, often, in a game context, players configure an avatar as their player for the game. As these avatars are being configured, clothing or accessories can be selected as part of the game. One aspect of this disclosure enables an improved and more dynamic presentation of selected items associated with an avatar, particularly with respect to how an item such as an article of clothing might actually look on that avatar. The avatar can be associated with a body model of the individual or a separate body model independent of user characteristics. The avatar could be a hybrid model with some characteristics of the user and some other characteristics independent of the user. When configuring avatars, users will desire to see in real-time how their accessories or clothing will look on their avatar.

The system can perform or create a simulation of items on a backend server for transmission and rendering on a client device. For example, a server can prepare a series of three-dimensional data which can be frames containing key attributes such as vertices points in a wire-frame mesh which, upon request, can be transmitted to a client device which can utilize a rendering engine to present visually one or more items on the body model. The three-dimensional data can include shading data, texture data, facial data, wire-frame data, or other data that can be used for rendering on the client device. In some cases, as users configure their avatar, they might play with different items and exchange one item of clothing for another. The user might also want to remove the portion of the body model that resembles their own body or change body models. When such changes are requested, the user will desire to see in real-time or near real time how the new item of clothing will look on the body model or how the existing item of clothing will look on a new body model. When real-time change options are being made, the change requests are transmitted to a server and the server generates new data for transmission to the client device for rendering. The reaction of the server and responsive time of course can be dependent upon the server capabilities, bandwidth available, client device capabilities, and so forth.

In some cases, a library or database of movement data could be accessed to respond to a change request. In other scenarios, the server implements a different rendering process than merely having a simulation prepared in advance. For example, the system according to the disclosure can present a simulation which is not predetermined but enables the user to change items associated with the body model and how the system will, in real-time or continuously, dynamically render new content such that the user experience is improved as newly selected items or changes to existing items or the body model can be demonstrated with respect to how one or more items would move or interact with the body model or environmental model.

The present disclosure can address various questions and desires of users as expressed above. Providing real-time and dynamic modeling of items or garments, particularly as users interact with a specific body model, can enable a more enjoyable experience for viewing, selecting items for purchase or for a gaming scenario. The approach disclosed herein can also enable a user to explore or test a garment's response to their particular body if the user were to run, jump or bend over, and/or other scenarios which could be revealing or embarrassing. The disclosure addresses these issues with novel rendering techniques and particularly in the context of dynamic changes to items as requested by the user. The item models can model features such as cloth physical characteristics, gravity, configuration or structure of the item, transparency with cloth stretch, how the cloth reacts when wet, how forces such as wind cause movement or reactions to the material, and so forth which, when combined with the environmental model (body model, group of models, etc.), can be used by the physics engine to produce three-dimensional data such as key attributes on a frame by frame basis which simulate the item as it would look and move on the body model or how an item would react to other forces within its environment. A model could, for example, represent the sun or a heat source which would cause a wet garment to progressively dry out and have its physical characteristics change. A longer animation starting with a wet garment in the sun could, for example, illustrate over time a transition of wet movement of the garment to dry movement in connection with wind or body movement.

In one aspect, for example, a user could participate in a gaming scenario with an avatar and cause the avatar to move from room to room. Some rooms may have different items of furniture, and different openings such as door or windows. As the user's avatar is caused to move from room to room, the server can generate renderings of clothing on the avatar that interact with each new environment and the respective forces within the environment. The modeling can include, for each environment, multiple models that take into account the avatar body, wind for that room, floor characteristics (hard floor, carpet, rough, smooth, etc.), items in the room, moisture, and so forth. The system can retrieve from a database of models the various models needed for each new environment and load them into the physics engine for generating three-dimensional data for each new environment to model the interaction of an item (which can be clothing or some other item) based on the various forces within each environment.

FIG. 1 illustrates the broad concept. System 100 includes a client device 102 and a network server 108. The client device 102 can be a mobile device, a desktop device, an internet-of-things (IoT) device, a smart television, a gaming system, or any computing device that has a graphical interface and can communicate wirelessly or via a wire network with the network server 108. In one example scenario, the user is viewing an item of clothing 104 and interfaces with the client device 102 via a button 106 or other mechanism, which can include any aspect of multimodal communications, to select the item of clothing 104. The user can access a website via a browser for viewing the item of clothing 104 or may be viewing an object within an application that is downloaded on their device.

An example of item 104 in FIG. 1 is a shirt. Typically, when the user selects the shirt 104, the selection can be in the context of in online merchant in which the user selects the shirt for potential purchase or wherein the user wants to view more information about the shirt. The particular state or context in which the user selects the item of clothing 104 is not necessarily material to the present disclosure. In some respects, an item is being presented to the user in a one click purchasing context but is then selected by the user for further viewing or exploration.

Generally speaking, the item 104 can be an item of clothing but can also be some kind of an accessory such as jewelry, a hat, shoes, and so forth. The item can be any item which has some association with the user in that the user might wear or use the item. For example, an umbrella could be the item 104 inasmuch as the user would hold the umbrella although the user would not wear the umbrella. The item could also be something like a glass or other object that is not necessarily worn by the user.

In another aspect, the item 104 can be an item in a room. While the basic scenario disclosed herein involves the body model in connection with an item model such as a clothing model, the idea could also be extended to other objects in a scene or in a room. As introduced in the example above, the physics engine disclosed herein could also model such items in order to illustrate the movement or interaction with their environment in some manner. For example, a person might be wearing a dress that would flare out if they spun around. The user might desire to see not only the movement of the dress while the user spins but whether the dress would interact with a table, a lamp or an item within a room. Wind could be modeled if there is an open window showing in a virtual room. The modeling disclosed herein can be extended not only to a body model and an item model but also object models within a surrounding space and could also take into account a position of the body model in the space relative to other objects. If one is modeling a shirt, the other relevant objects could include a user's body but also the pants that are worn by the virtual body or jewelry worn by the person.

When the user selects the item of clothing 104 for viewing, data is transmitted to the network server 108 to identify that item of clothing 104. The next issue is how to simulate a view of the selected item on the client device 102 in a way to give the user a realistic physics simulation of the item of clothing 104 on the particular body model. If the item of clothing 104 is a shirt, the user will want to see how that shirt will look on them rather than just generically. Server 108 includes or has access to a body model 110 that is associated with the user of the client device 102. The body model 110 can be the body model of the user or some other body model such as the body model of a friend or person that the user desires to buy the shirt for.

The body model 110 can include a profile which can capture the customer's body shape, measurements and even style preferences and can use a profile database to extract and store the customer information. The mechanism by which the server 108 identifies the body model associated with the user can vary as one of skill in the art would recognize. It is generally assumed that the server 108 has access to the body model in that the user desires to view the item of clothing 104 as it would interact with the chosen body model. The user may select a body model from a drop down menu of predetermined or typical body models based on general size data (one or more of height, weight, waist size, bust size, etc.) or may be a specific body model generated for the user that is configured for the user's specific body characteristics. The body model 110 may also be the body model of an imaginary person or avatar and can include at least some characteristics of the user but may not be a complete body model of the user. For example, the body model may be the body of an actor but the face of the user.

The request for the item of clothing 104 can be for a static view of the item of clothing 104 as it would rest on the body model 110 and thus can include a request from the client device for a single frame. The request can also be for a series of frames which illustrate general movement of the clothing or might be for a specific number of frames. The request can be general (raise arms) and be translated into a specific number of frames by the client device 102 or the server 108. Where multiple frames are requested, the physics engine generally will continuously generate frames and transmit those frames to the client device 102. How close the system gets to a "real-time" response will be dependent on the computer capabilities of the system and network.

The body model 110 can also represent an environmental model which can represent wind, items in a room, a light source or a heat source, clothing, and so forth. Generally speaking, the model 110 can represent anything that can cause a force to impact on the object model 112 which is also on the server 108.

The object associated with the object model 112 can be clothing, jewelry, furniture, an accessory, or any item which can be factored into a scene which could be modeled in a way to interact with the model 110. Once the server 108 identifies the model 110, and receives the item request, the system can in real-time generate three-dimensional data based on the object model 112 regarding how the object would interact with the forces or existence of features associated with model 110. For example, the model 110 includes data regarding the physical characteristics of the object. The server can include a physics engine 122 which will receive the model 110 and the object model 112 (and potentially other models as well) and generate one or more frames of data for transmission to the client device 102. The frames of data can include three-dimensional data such as key attributes (vertices, shading data, texture data, facial data, wire-frame mesh data, and so forth) rather than the full image data for each frame. For example, the key attributes can include vertices points on a wire-frame mesh which provides the general contours of clothing as it would rest and move on the particular body model. The general contours can also represent how the clothing 112 would interact with wind when the model 110 represents wind forces. The model 110 can also represent multiple models such as one model for the body of the user or an avatar, another model for wind coming from a source such as an open window, and another model for the physical characteristics of a floor, wall, furniture, or other object within a virtual environment. The three-dimensional data generated for rendering can be generated frame by frame by the graphics engine 122 and transmitted, as they are generated, to the client device 102 such that a rendering engine on the client device can render the frames 114 and show the item or item movement.

In some cases, the client device 102 will have limitations with respect to rendering capability. For example, some mobile devices might not be able to perform high-end calculations, simulations or local rendering. In this respect, the server 108 can transmit three-dimensional computer aided design file images which can then be displayed on the client device 102. Feature 116 illustrates the three-dimensional simulation. If the mobile device 102 has partial or a reduced rendering capability, the server 108 can generate and transmit some full image frames and some frames only having key attributes, depending upon the capabilities of the device. This will be discussed more with respect to FIG. 4 below.

The particular rendering strategy can vary in this disclosure. The server 108 may generate vertices associated with a wire-frame mesh, may generate the actual images, shading data, texture data, and/or some other representation of a three-dimensional mesh that the customer sees. The vertices are typically the dots or intersection points that make up or define the triangle or other shapes of a wire-frame mesh. The simulation in this case is particular to the item as it fits and/or moves on a particular body model. The simulation can also be an object as it interacts with forces associated with other objects such as a body, wind, moisture, the floor, a wall, furniture, other clothing on a body, and so forth. The simulation can represent the change or movement in one particular object in view of forces impacting upon that object from one or more other sources or combination of sources. As the simulation is being generated in real time (particularly with respect to change requests), the server 108 can start generating frames and begin streaming the frames as they are generated while dynamically continuing to simulate additional frames. Each frame can represent a new set of data such as new vertices which define the model movement from frame to frame. The client device 102 then renders each frame.

In the case where the three-dimensional data that is generated are vertices, the first frame transmitted defines how the dots of the wire-frame mesh connect with one another. With later frames, the data can represent the movement relative to or from the previous frame. Other data that can be sent includes texture information, shading data, or other data needed for rendering. Normals represent an orientation of an object surface at a particular point. A normal N at a point P on an object is perpendicular to the surface at the point P. In other words, the normal N is the vector perpendicular to the surface tension at the point P on the surface of the object. This data is used for shading purposes inasmuch as the brightness of a point on the surface of service of the object can depend on the normal direction which defines the orientation of the object surface (or portion of the object surface according to a respective polygon) with respect to a light source. Normals may or may not be sent as part of the three-dimensional data transmitted to a client device and sending normals can depend on the rendering capability of a respective client device.

In another aspect, only data that is viewable to the user needs to be sent. For example, the system will have data regarding the body model and a clothing/item model. However, when the physics engine generates frames of the clothing as the clothing would move on the body model, the server 108 does not necessarily need to transmit body model vertices because they are not viewable by the user. Thus, one aspect of compression or of improvement in terms of bandwidth usage, can include transmitting only the viewable vertices from the server 108 to the client device 102. Where a clothing item can become transparent however, when the item stretches or is wet, for example, the system may determine, based on a transparency value associated with the item and requested movement or a requested pose, that some body model three-dimensional data needs to be sent as part of the body might be revealed through the transparent nature of an item of clothing.

In other approaches, a simulation can be completely prepared and then streamed to the client. The users experience in real time in that case would likely require the user to wait 30 seconds or even minutes for the simulation to occur before they would start to see changes or the initial movement of the simulation. The approaches disclosed herein provide more real-time responsive simulation and improves the user experience. The server 108 can generate and transmit 20-30 frames per second using an approach of generating vertices positions for a scene that are then rendered on the client device 102.

In one aspect, by delivering vertices from the server 108 to the client device 102, the user can make other change requests without needing to have new data sent. For example, the user might be able to select shirt patterns which can be incorporated on the client side to the display model 116 without the need of re-generating a new rendering from the server 108.

Having viewed the feature 116, the user may choose to buy 118 the item or may desire to change 120 aspects of the item. These changes are customization parameters requested by the user. Changes can include a number of different factors. For example, the user may desire to change the sleeve length or how tight the object fits. The user may also desire to have the body model move such that the user might be able to see how the garment or object looks when the user runs or raises their arms. The user in real time requests a customization and expects to see, in response to the request, the animation that is specific to the item and the chosen body model or other models in a scene.

The change request 120 can include a number of different types of change. For example, the user may request that the body model move in some particular manner. The change request 120 may include a change of the body model such as a request to take 10 pounds off the body model to see how the item of clothing would look in that scenario. The change request 120 may add objects to a scene such as a table, a lamp, a different kind of floor, an open window, a change in lighting, a wind force and a source location, a change to make the clothing wet, and so forth. Each change request 120 sent to the server 108 can cause the graphics engine 122 to make adjustments as requested and to start generating new frames. For example, the graphics engine 122 might make an adjustment to the user's body model to reduce its weight or to add an object to a scene (thus requiring the loading of a new object model into the graphics engine122) or to lengthen the sleeve of an item of clothing being shown on the body model. The physics engine 122 can start to generate frames showing how a shirt looks when the user raises their arms. After having retrieved the appropriate changes to the data input to the graphics engine, new frames are generated and transmitted to the client device 102.

As the user requests change options 120, the device 102 can report the change request to the server 108 and a new three-dimensional rendering can be generated in real-time and returned to the device 102. This exchange of change or adaptation data is represented as feature 122. The request 122 can be considered a simulation request of some type. The request 122 received by the server 108 can relate to a request to load either a static three-dimensional asset (like an existing body model or an image of a shirt on the body model) or to load an animated three-dimensional asset (like a body model 110) and see how cloth draped on that asset interacts according to some specific motion. The request 122, when considered a simulation request, causes the server 108 to generate frames that illustrate the step-by-step interactions of the cloth (or other accessory) with the model 110 and to transmit frames as they are generated to the client device 102.

The change request 122 can also include a specific number of frames that need to be generated. For example, for a lengthy movement that is requested, the system may need to generate 200 frames. The change request 122 can include the number of frames or can include the more general description of the movement (e.g., raise the right arm above the head) which can be translated into a number of frames needed to simulate the movement.

The change options can also include the user interacting with the body model which would cause the body model to move. For example, the user interface may enable the user to virtually take the hand of the body model 116 as it is wearing the selected item and move the hand or lift the hand up. This could occur, for example, by the user clicking a pointer on the hand of the body model and while holding down the mouse button, moving the hand. The user would desire to see how the garment would react to that body movement. The change data 122 can include manual manipulations of the body model as shown on the client device 102 and that are transmitted to the server 108. The server 108 initiates, based on the change data, a new rendering of the garment 112 as it would respond to that movement and how new or different forces would impact the garment 112.

As a real-time experience is needed in this case, where the user would not want to cause the hands to move and wait 10 seconds or 30 seconds to see how the garment would respond, the server 108 will initiate the rendering of that new movement of the garment 112 in view of the movement of the body 110 as selected by the user. As the new rendering is generated frame by frame, respective frames are continuously transmitted from the server 108 to the client device 102 such that the user in real-time or near real-time is able to visualize exactly how the garment would respond to that movement. In this scenario, the "real-time" characteristic relates to an immediate effort by the physics engine 122, given its physical capabilities with respect to his processor, memory, bandwidth capability, and so forth, to generate three-dimensional data and transmit it to the client device for rendering.

As the body model that is wearing the selected garment 116 is three-dimensional, the user could also rotate the graphical presentation 116 in any direction such that the user can view the presentation 116 from the top, from the bottom, from the back, and so forth. The user could rotate the model 116 and then select movement of the body model in a particular way and the server 108 would be able to dynamically begin rendering the new movement and transmitting frames to the client device so that the user can almost immediately enjoy and experience the characteristics of the garment or fabric behaves according to the movement instruction.

Figure 2:
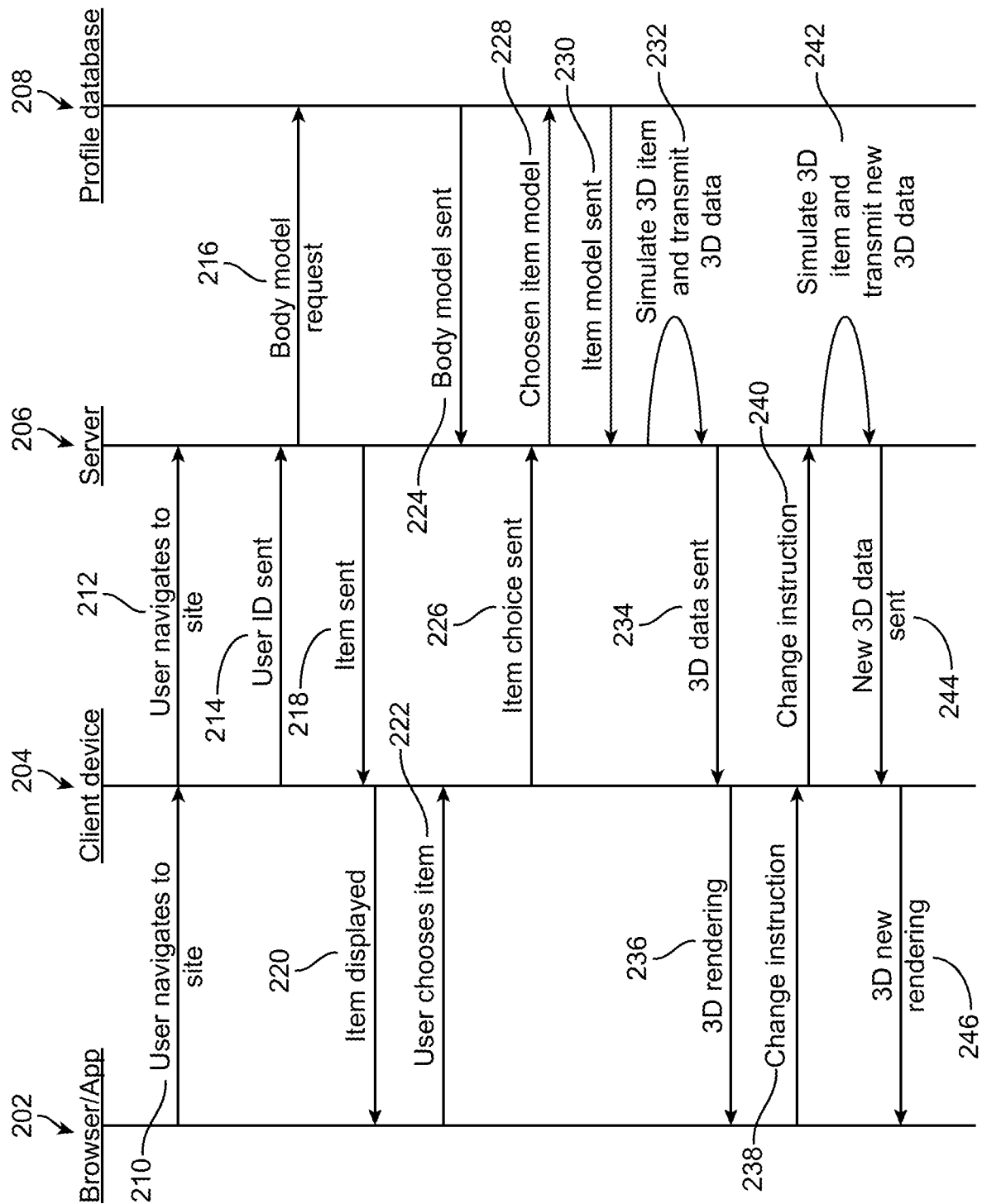
FIG. 2 illustrates a client/server environment which is applicable to the present disclosure.

FIG. 2 illustrates the signal processing between the browser or application 202, the client device 204, a network server 206 and a profile database 208. The profile database 208 can include stored body models related to users but can also store other body models such as body models of famous people, generic body models, avatars, animal body models, and so forth. The database 208 can store other item models as well as discussed herein. Users can input a photo or photos of themselves, their height, gender, or other data, and a service can analyze that data and generate a body model which can be stored in the profile database 208. The profile database 208 represents a library of models that can be accessed for use by the server 108 for synthesizing three-dimensional graphics. The models could also include other objects such as cars, plants, trees, homes, wind speech and/or direction, fluid characteristics for items, and so forth. Using various models, the system could simulate at least a portion of a scene and frames can be generated by a physics engine (122) and transmitted to the client device 204 which model the movement of any item relative to another item.

The simulated portion of a scene might be clothing on a body model or avatar that is integrated with the other graphical features of the scene which are rendered in a more traditional fashion. Thus, an entire scene can consist of a portion generated by a physics engine disclosed herein and standard video or other animation generated according to a different technique.

The series of steps disclosed herein can occur in a different order and are meant to be generally representative of the flow of requests and responses between the various components. First, assume that the user navigates to a site 210 via a browser or an application 202. If an application is used, the user might be viewing local content as well or a combination of local content and web-based content. The client device 204 transmits 212 the navigation data to the server 206. In this respect, the user essentially lands on the site, such as www.merchant.com or has opened an application and is interacting with the application. The user can be accessing content via a web experience, a mobile experience, via an Internet of Things device, via an application downloaded on their device, a progressive web application, and so forth. In some scenarios, the user device has a powerful graphic processing unit (GPU) which is a specialized circuit that is specifically designed for accelerating graphical presentations which can include a rendering engine. In other scenarios, the user might be on a mobile device without a separate or specialized GPU. The device 204 that can be contemplated for use in this disclosure can render three-dimensional assets and thus have a certain threshold level of computing power and display capability. Typically, rendering a three dimensional image includes the capability of handling parameters such as shading, texture-mapping, shadows, reflection, transparency, translucency, refraction, diffraction, depth of field, motion blur and so forth.

An aspect of this disclosure contemplates a tight coupling between the client device 204 and a server 206. The coupling enables a balancing of processing and data that can be communicated between the devices. For example, if the client device 204 includes the ability to display shadows based on normals that can be transmitted to the device, then the type of data transmitted from the server 206 can include those normals for rendering on the client device 204. However, if such a capability does not exist on the client device 204, then the server 206 can generate shadow images and transmit the images or frames to the client device 204. For example, if the client device 204 is an APPLE® product, the operating system may include SceneKit framework which has capabilities known to those of skill in the art but which can enable various options for choosing graphics technology for viewing or rendering objects. Servers can use a rendering API property when initializing an object. SceneKit incorporates a physics engine, a particle generator, and enables simplified mechanisms to script actions of three-dimensional objects such that users can describe scenes in terms of content such as geometry, materials, lights, and cameras and then animate the scene by describing changes to the objects. Thus, if the client device 204 is detected as having the SceneKit capability, then the type of data that is transmitted from the server 206 to the client device 204 can take this capability into account and reduce the amount of data needed in order to render the item in connection with the body model 116.

At some point in the process, the user is identified 214 via a login or other identification mechanism. Having identified the user, a body model request 216 can be provided to a profile database 208. The server 206 can also have this data stored thereon as well. The timing of this request can also vary depending on data requested by the user.

It is assumed that as the user navigates to the site, that at some point in the navigation process a context or a state is reached in which an item that can be worn by the user is displayed. A representation of item is sent 218 from the server 206 to the client device 204 and the item is displayed 220 on the browser 202.

For example, if the user is navigating a merchant site and is looking for shirts, at some point in the navigation, a shirt is selected by the user and displayed via a browser or application. The user then might select the shirt for further viewing 222. The selection can be part of the purchasing process or independent of the purchasing process. For example, the user typically will desire to see how the item will look on the user's own body. The user selects the item and that item choice is sent from the client device 204 to the server 206. The server 206 will then request an item model 216 from the profile database 208 or from some other source. The profile database 208 can return the item model 224 to the server 206. The server 206 might access the item model in other ways as well. At this point, the a physics engine that can utilize the individual's body model and the item model (and other models as well) to simulate a three-dimensional item rendering of that item on the user's body 232. Typically, this will involve clothing but can also involve other accessory items like jewelry, shoes, hats, umbrellas, wind, cars, or any item that a user may interact with and the can be presented via a three-dimensional rendering.

The simulation 232 performed by the physics engine on the server 206 can vary the type of simulation depending on the capabilities or configuration of the client device 204. For example, if the client device 204 has rendering capabilities, then the data that is sent 234 can be the three-dimensional vertices and the necessary data to be used by a local rendering engine on the client device 204. In another aspect, if the client device 204 is an older device or has a less or no three-dimensional rendering capabilities, then the simulation process 232 may involve simulating the actual images which are simply transmitted frame by frame 234 to the client device 204 for viewing in a browser or an application.

The simulation of the three dimensional model is performed quickly by the server 206 within its capabilities so as to be experienced essentially in real-time or near real-time for the user. The server 206 will generate three-dimensional data such as vertices associated with a wire-frame mesh of the simulated item and can transmit the three-dimensional vertices 234 to the client device 204 for rendering 236 by the browser or application 202. One example scenario is a three-dimensional rendering of a body model of the user wearing an item of clothing. However, the simulation of the three-dimensional item in step 232 can also include a number of models that are incorporated into a single simulation. For example, the user may desire to see how they look in a shirt, a pair of pants, and a necklace. Having made these requests, the server 206 would retrieve the user's body model, a model for the shirt, a model for the pants, and a model for the necklace. The server 206 would generate a rendering of the scene or portions of a scene which includes the combination of how each of these items would interact with the body either at a standstill or based on motion as described herein. Where multiple models of items are used in connection with a single body model, the interactions between the various items are also modeled. For example, where the server 206 knows how the pants will fit on the body model, the engine that is generating the graphical representation of the scene will also know how the shirt will interact with the pants and the body model together. For example, the user could request a view of the shirt tucked in or the shirt untucked. The server 206 will utilize all of the various models in its rendering analysis to generate the frames or key attributes that are transmitted to the client device 204 for rendering.

The system may be able to generate models or renderings and also highlights or identify problem areas. For example, making a particular movement while wearing a style of shirt may be embarrassing or revealing. These configurations can be highlighted to the user based on the simulation or the combination of the user's body model and the item model. Thus, even if the user does not request movement of the body model in a way that would identify embarrassing situation, the system could present to the user an option to view the potentially embarrassing poses and how the clothing will look or move in response to those poses. Such poses could be pre-simulated and stored in the library and ready to show to the user in real time. The system can also model or identify for the user such potentially embarrassing poses and present an option for the user to see situations where the garment might not perform as desired.

In another aspect, the transmission of three-dimensional vertices 234 can include a variation from frame to frame in a particular way. For example, a first frame may include data regarding a physical relationship between vertices and other data to create the initial wire-frame structure. Later frames may, in some examples, only need to include vertices that have changed from a previous frame. This approach can reduce simulation time and reduce bandwidth requirements and increase the speed at which new frames can be transmitted and rendered on the client device 204. For example, with reference to FIG. 4, a model 414 might have a change request associated with raising the arm of the model but the head will not move in the change request. New vertices can be sent for only the portion of the model 414 that involves movement or change in position. After a series of frames, the server 404 may generate a new complete set of data to reset the simulation 414 and then again begin to send reduced subsets of vertices only based on movement or changes from a previous frame.

The triggering of the simulation of the three-dimensional item can be based on the number of different stages of the process. For example, FIG. 2 illustrates essentially the triggering of the request for the item model upon the user choosing the item 222. Once the server 206 receives the user's body model and the item model, then the rendering engine can enable a virtual try on experience and generate the appropriate vertices for transmission to the client device for rendering. Again, the goal is to be able to be responsive to the users request or to be as quick as possible in terms of rendering the three-dimensional item specific to that body model and transmitting the data to the client device 204.

A wire-frame of the movement of the item 222 can begin to be generated and transmitted frame by frame from the server 206 to the client device 204 and can include other data such as, for example, bitmap textures, lighting data, bump mapping, normals, weather conditions, and relative position to other objects. A rendering component on the device 204 will complete the image shown on the browser or application.

In other stages, the system could evaluate the navigational progress of the user on the site or app and pre-stage simulations or a three-dimensional model prior to the user selecting a particular item. Often users begin with a more general type of clothing before picking a particular shirt, pair of pants, and so forth. In this regard, the server 206 can predict or estimate and actual item of clothing that the user might pick according to the user navigation and pre-simulate three-dimensional models of respective items. In one aspect, assume that the user has selected to view polo long-sleeve shirts and in response to the search request, the merchant provides three options. The user has not selected a specific option to explore further at this stage. However, the server could begin to simulate a three-dimensional model for each of the three shirts for the user's personal body model. The server 206 could transmit three-dimensional data for all of the models to the client device 204 and only show the rendering of the shirt that is selected by the user. The server 206 may generate the initial more detailed, complete first frame for each of a group of items that could be selected and a series of follow up frames for specific items which can increase in volume as the probability of a particular item being selected increases. If the user were to further select the other two shirts, the three-dimensional item models could be pre-positioned or pre-stored for the media viewing as well.

In another aspect, the system can pre-stage related three-dimensional items and store them on the server 206 such that as the user begins to navigate deeper into the site structure, and as they transition closer to selecting an individual item, the potential items for selection are pre-simulated on the server 206 and ready for transmission. Such pre-staging can improve the user experience as they won't need to wait for the generation of frames in response to a request.

Once the user is presented with a three-dimensional rendering 236, the user can see how that item will look on their own body. Simply viewing in a static manner how an item of clothing or other accessory will look on the user's body might not be sufficient. For example, the user might be interested in how the garment or the item might look if they bend over or raise their arms or twist their body. FIG. 2 illustrates a change request or change instructions 238 that is received via a browser or application 202 in which the user requests some kind of change associated with the item. The change can be a request that a short-sleeved dress be modified to a long-sleeve dress. The change can also be a change in pose or even a change in the characteristics of the body model. The user may request the body model showing the item to bend down, dance, jump or run. The user may request that the body model lose 5 or 10 pounds and then see how the clothing fits. The user may request a change in the hair style of the body model. These kinds of options can be presented on the user interface presented via a browser or an application 202.

The change can also be a change to some kind of force that would impact on the item. For example, the user may request that wind be introduced into a virtual scene or that a different item of clothing be placed on the body model to see how the different item of clothing interacts with the item they desire to buy. For example, the user may be interested in a shirt that desires to see how the shirt looks with a particular pair of pants were with a particular coat. The user may desire to see how the clothing would look when wet or damp or in a more humid environment relative to a more dry environment. These kinds of change requests are communicated to the server 206 and then implement it into the physics engine for generating new three-dimensional rendering data.

Generally speaking, feature 238 represents a change request of some sort that is transmitted 240 from the client device 204 and to the server 206. The change will typically involve some type of movements of the item, a change in an environment around the item, or a change to the item in some other manner. Based on the change request and the parameters identified within the change request, the server 206 will simulate a new three-dimensional item 242 and transmit new three-dimensional data such as the key attributes, vertices or data 244 associated with the new three-dimensional simulations back to the client device 204. The client device 204 can generate a new rendering 246 illustrating the change. The change request 240 or the item sent 218 can include a request or instruction regarding how many frames should be rendered as part of that request. If the request is merely to show a shirt, for example, only one frame may be needed to show the shirt 112 on the body model 110 in a combined form 114 for display on the device 204.

The change request could also include other types of changes that might be relevant. As noted above, the change request might indicate that the user desires to see wind at a certain speed blowing on the body model. The server 206 can access a profile database 208 with wind models which can then be incorporated into the physics engine for generating frames that would indicate or show how the item would look on the body model with that type of wind. The user could indicate the wind direction from which the wind is blowing. The user could indicate a wind speed or force. The user could indicate that it is raining or that they desire to see how the item looks when it is wet. This could be particularly important for a swimsuit, for example. The characteristics of the item such as transparency when the item is wet or stretched can be incorporated into the item model 112. Thus, the physics engine on the server 206 can simulate opacity, stretching characteristics, wetness characteristics, or other characteristics associated with any item of clothing or other accessory in connection with how they would be viewed on a body model with these characteristics.

In another aspect, the change request 238 could involve the user requesting an avatar to move from room to room, for example, in a gaming environment. The server 206 can maintain various models representing the various objects or forces that could impact the clothing on the avatar as the user because of the avatar to move from space to space. The system could thereby be dynamically generating the data regarding the movement of the clothing on the avatar based on these various forces. The result would be a more realistic and enjoyable experience for the user interacting in such a virtual environment. The three-dimensional data can be transmitted to a client device and represent a portion of an overall scene viewed on the device. For example, the physics engine may generate the clothing of an avatar and how it moves in a scene and another engine may generate the furniture, walls, room, etc. around the avatar for transmission and presentation on a client device. The ultimate scene can be a concatenation of some data generated by a physics engine as disclosed herein and other data simulated in a more traditional manner.

The body model in connection with the item model, with respect to processing a change request, can be provided to a physics engine 122 which can generate or simulate quickly on the server the new movement of the item in connection with the user's body. The goal is to provide a high number frames per second such that the user can make a change request and essentially see the changes in real-time or near real-time. The three-dimensional model of the garment in a static form or in a simulated motion form as streams from the server 206 to the client device 204. The physics of the item or the garment is calculated on the server 206 which can include the change request or the motion relative to the user body model. The physics of the item relates to the motion of the item relative to the model (i.e., forces that interact with the item) and can include other factors like gravity or wind. For example, if the user causes a body model hand to quickly rise or to move back and forth, the physics of how the cloth of a sleeve of a suit coat will respond to that arm movement is what the physics engine will simulate for rendering.

In connection with the simulation of three-dimensional data 232 or 242, the processing of the algorithm can be a loop in which the algorithm is run for each frame based on the client instructions. The server 206 renders the frame(s) and pings a node endpoint in which the node endpoint has an open websocket stream with the client device 204 that is used to send the data (vertices or other data configuration) to the client device 204.

It is anticipated that the simulation time for either step 232 or step 242 would be less than two seconds in order for the user experience to be close to real-time for the user. If the request from the client device 204 was for multiple frames, then the response would provide as many frames per second as possible given the technical capabilities of the system and network, and preferably for at least 14 frames per second.

In another example, characteristics of the item that are built into the item model 112 are simulated in steps 232, 242, both with respect to movement on the body as well as other characteristics. For example, a wet garment will have certain characteristics. Spandex clothing will also have particular characteristics when stretched. These types of characteristics can be built into the item model 112 and be taken into account by the physics engine 122. In other words, the item model 112 can take into account transparency of the material upon stretching. These physical characteristics of an item can be programmed into the item model 112. Thus, depending on the user's body model, other forces, and the motion requested, if the user indicates a motion of bending over or stretching in a certain way, the clothing may become more transparent or more revealing. The physics engine 122 can take this nature of the item into account such that the final rendering of the item or the rendering of the item as it moves can be graphically presented on the client device (102, 204) and particularly show the transparent nature of the item given the movement, or the item condition, and so forth. Such transparency can also be highlighted by the system as a potential problem. The user may see a visual marking that brings their attention to the issue.

A graphics engine 122 on the server 108, 206 can be programmed to enhance or highlight such features in order to ensure that the user sees a visual representation of the transparent nature of clothing, for example. The graphics engine could be programmed to ensure that such features would be shown to the user and highlighted in some manner. For example, if the client device 102, 204 has its own rendering library, and the server 108, 206 is transmitting only vertices data to the client device 102, 204 for rendering on the client device, such a balancing of processing tasks might not result in the user visually appreciating the transparent nature of the clothing item given the particular move. In such a scenario, the physics engine 122 on the server 108, 206 might switched to a different mode and transmit full images or key frames or other instructive data to ensure that not only the shape of the garment is represented to the user but also the transparency or the transparent nature of the garment or portions of the garment based on one or more of a requested motion, a requested wetness level, and so forth. This can also be represented by texture data which can be generated based on the item model (transparency) plus the body model (body shape, color characteristics, etc.).

One aspect of compression as introduced above is only to send vertices of items on the user's body model that are visible to the user. Thus, body model vertices might not be sent. However, if a certain movement of a body wearing a particular type of clothing causes stretching or a transparency issue, then the system may need to generate frames that include body vertices and/or other data such as underwear or jewelry or other items that might be viewable through the transparent region of the clothing.

For example, if the user requests a video of how they would look in spandex or yoga pants while bending over, if the physics engine determines that a portion of the pants will become transparent or partially transparent, then the physics engine 122 may add some vertices associated with the user's body as well as some additional data regarding underwear or skin which might now be viewable at least in part. The system can calculate the stretching of the fabric when doing certain moves and can transmit that data to the client device to show not only clothing shape but clothing transparency. The server can instruct the client regarding how much opacity to apply to the texture at a portion of the clothing and in connection with a particular move.

Figure 3:
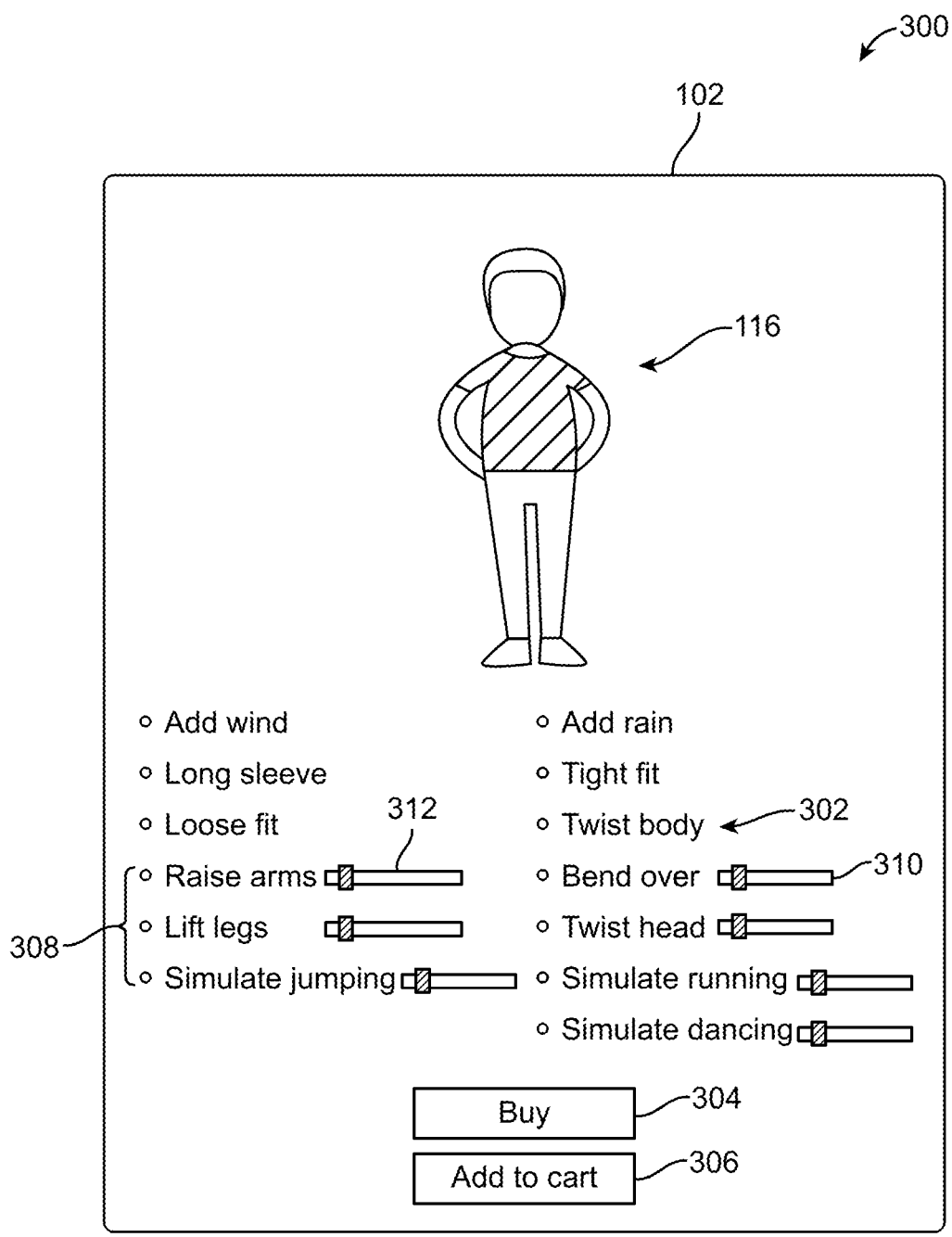
FIG. 3 illustrates an example option presented to the user for selecting changes to the item.

FIG. 3 illustrates a view 300 of some of the various options for making change decisions to the presented model. The features in FIG. 3 illustrate various options for selecting what type of change to present to the user in the simulated item 116. Typically, at an initial stage, a static image is transmitted from the server to the client device 102 with the three-dimensional computer aided design file vertices which are then rendered on the device. Having presented the initial static image, the user can make various changes which can be transmitted back to the server for simulation and resending. As shown in FIG. 3, the shirt is a short sleeve shirt as the initial image. The user can choose 302 to render a long-sleeve shirt, a tighter fit, a looser fit, or other different fits as would be appropriate for the item.

The user can also select movements such as asking the model to twist, raise arms, lift legs, simulate running or jumping, etc. 308. Any movement can be requested and those movement requests are transmitted back to the server for simulation by the server. The server then sends back frames with the vertices points or other key attribute data for three-dimensional rendering on the client device. The user could select a movement type, such as turnaround, twist, and so forth, and moved the slide bar back and forth to manually control the movement. In another aspect, the system can have automatic movement that is implemented showing the model twisting, or bending over, or raising and lowering arms, and so forth. Slider bars 310, 312 can be provided with any change request which enables the user to made granular changes to each type of motion. Other changes can also be provided such as adding rain, or wind, or other objects to a scene as well.

The package of change options can of course vary depending on the type of item. If the hat is presented, change options might include turning around and nodding the head of the model. If the item model relates to a bracelet or necklace, particular move options can be presented for such an item. If the item is shoes, options can be presented for walking and moving the model feet in a certain way. Combination of options might be presented where there are multiple items presented such as a shirt, pants and a purse. Thus, one aspect of this disclosure relates to evaluating the presented item or items and potential types of movements or changes to the simulated model that might be particularly relevant to evaluate how the item or items will move for that user's body model. The server presents those relevant options in the user interface in connection with presenting the three-dimensional simulations.

In another aspect, the server may transmit the three-dimensional data not as a static image but initially as a dynamic image. The simulated body model might be pre-programmed or predetermined to have a particular kind of movement. For example, if the user selected a dress, the initial presentation of the three-dimensional simulation data might include movement for illustrating how the dress would fit on the user. Thus, the model may swing back and forth and then turn around to illustrate the movement of the dress. The associated movement could be predetermined movement and simulation data could be pre-staged and stored for transmission frame by frame to the client device. Of course the, user could select further motions or changes but the model could initially be simulated and transmitted to the client device at a certain number frames per second to illustrate the movement without any specific request from the user. Where the user might be a ballerina, or a football player, or gymnast, the system may select certain kinds of movements that match sporting activities or other activities that the user does, which can have particular kinds of movements. The movement could be based on the type of clothing selected.

In another aspect, a random number generator or other component can generate random movements associated with the scene. In this regard, the system can indicate or generate instructions regarding random movements to be applied to the model. The physics engine can receive the instructions regarding random movement, then simulate the physics of how the items will move based on the random movement, and deliver or transmit the simulated physics to the client device. In many situations, having such predetermined or random movement of the body model in connection with the physics of clothing or other accessories with the body model make the viewing experience more normal and enjoyable for the user.

With respect to predetermined movement, the system could develop a library of simulations for items associated with a particular user's body model. For example, as the user signs up with the service or the service receives a body model of the user, the physics engine could begin to simulate a set of basic images or videos of clothing particularly fashion for that body model. The library could be developed well in advance based on expected or an initial set of items or may be more dynamic. For example, if the user lands on a particular websites for Rugby shirts, the system could begin to simulate using the physics engine a number of different simulations of Rugby shirts on the user's body model. A library or database could consist of item simulations for a particular user or for a particular body model. Other libraries could be configured based on the item such as different body models for a particular shirt. Of course each database item can be indexed and made searchable such that as a user requests an image, video or change, the back and server may be able to access a library of items to respond to the request quickly. Developing a library in this manner can expedite the ability to have a simulated model ready for transmission to a user device.

The present disclosure can also apply to a more dynamic scene in the sense of multiple different objects, rather than say a single shirt on the user's body model. Other aspects of scenes such as background, wind, lighting, additional objects entering or leaving the scene, and so forth can also be modeled in the physics engine and applied to the present scenario. For example, the user may cause their body model on a screen of their mobile device to move over to a trampoline. The user may instruct the body model to jump on the trampoline. A model associated with the trampoline can be incorporated into a physics engine. New frames can be generated and transmitted to the client device showing movement of clothing on the body model as it jumps on the trampoline. In this case, gravitational forces can be modeled in connection with the body and the movement on the trampoline to yield three-dimensional data regarding clothing movement in that environment.

In another aspect, since one of the goals of the present disclosure is the real-time simulation and delivery of particular physics simulation of initial objects on client devices, and particularly on client devices without a lot of computing or rendering power, the present disclosure can also include other pre-staging of simulate in models.

For example, as the system delivers an initial three-dimensional rendering 116, and presents various options for movement, it would be understood that simulating movement would take more processing power and time that simulating a static image of a shirt on a body model. The system can deliver a static image and then begin to simulate the various change options that are presented to the user. In this scenario, if the user then selects a tight fit for the shirt, that simulation model may already be prepared by the server for delivery to the client device 102. The system could even monitor movements related to user activity which can trigger the initiation of model simulation. For example, if the user was on a computer with a mouse and began to move the mouse towards the jumping movement option, that data can be transmitted back to the server which can initiate the simulation of that particular movement model for more efficient response times to the user's request.

Figure 4:
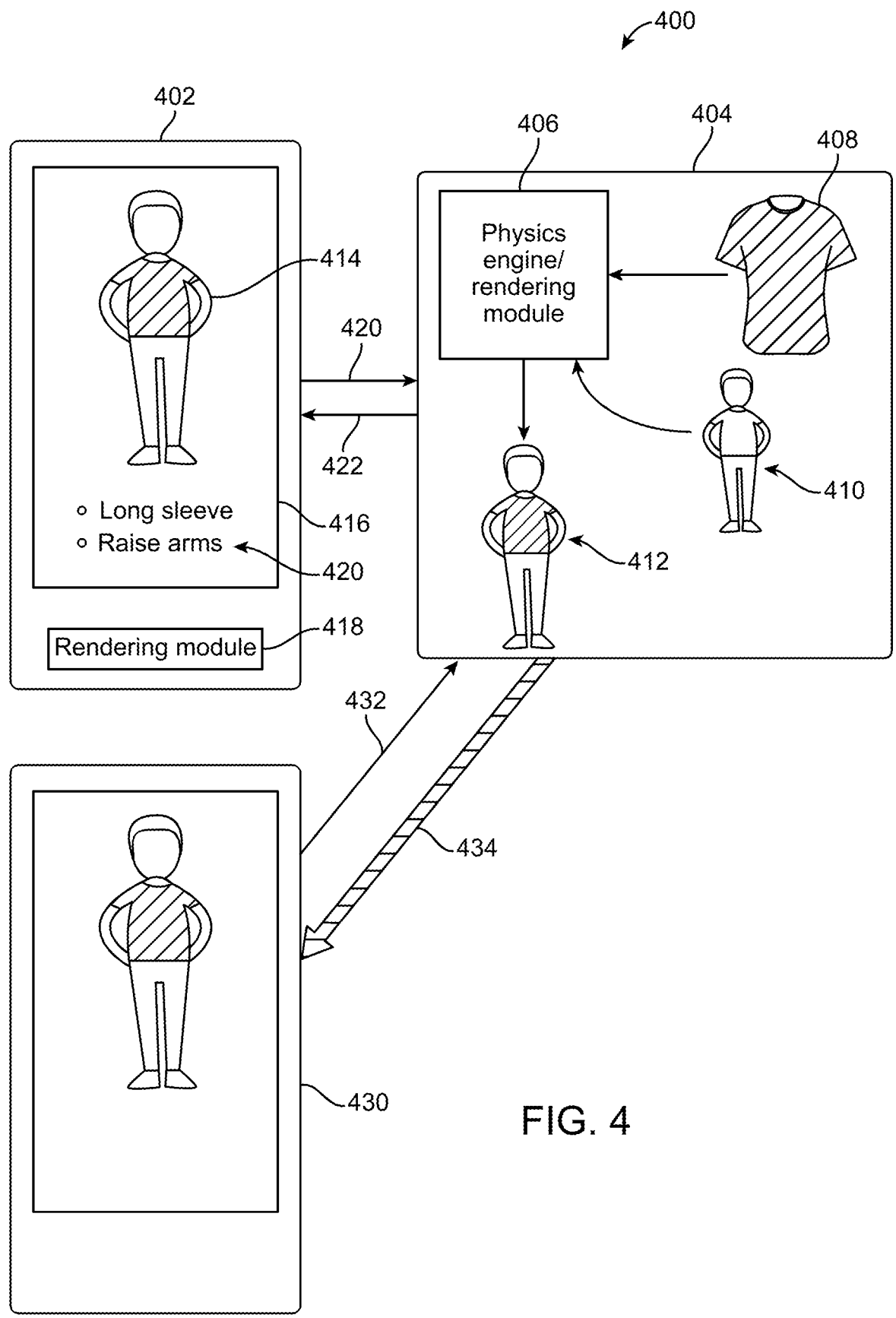
FIG. 4 illustrates a balancing of processing performed at least in part on a client device and in part on a server device for generating a three-dimensional object.

FIG. 4 illustrates another aspect of this disclosure which relates to balancing the computer processing between a client device 402 or a different client device 430 and a server 404. The network 400 illustrates how each of these devices may perform at least a part of the simulation associated with presenting the three-dimensional item on the user's body model 414 or with other models. The aspect disclosed above generally involves the server 404 simulating the three-dimensional object using the physics engine 406 and transmitting the three-dimensional data such as vertices points to the client device 402. Feature 406 represents the physics engine or simulation engine that receives as inputs the item model 408 and the model(s) 410 to simulate the physics of the item in connection with the model 412. The system may receive various points of data to evaluate whether to completely simulate three-dimensional object on the server 404 or whether to only simulate key attributes such as vertices at the server 404 and transmit the data for rendering on the client device. For example, as the device 402 communicates with a server 404, data regarding the competing capabilities of the device 402 can be transmitted to the server 404 such that, based on the computer capabilities of the client device 402, the server 404 may determine whether to completely simulate full images for a three-dimensional object or whether to simulate every fourth vertices or what percentage of vertices to generate. The rendering or image generation can be between 100% and 0% between the device, or 50/50 or 20/80, depending on the capabilities of the client device 402/430. The algorithm run by the physics engine 406 is essentially a loop that calculates or generates each frame based on factors such as what each particle of a clothing item will do based on movement instructions of the body, gravity, neighboring particles, etc. The algorithm will calculate each particle on a frame by frame basis in a loop. The client device 402 can request in a number of different ways the number of frames that are needed for showing the movement. For example, the user may request or manipulate the arm in the body model to be raised up. Such a change can cause the client device 402/430 to request 50 frames to illustrate or simulate that movement. The instruction will be transmitted to the server 404 from the client 402 for 50 frames with data regarding the movement direction and the physics engine 406 will start computing frames and transmitting the frames as soon as possible for rendering.

In another aspect, assume that client device 402 has a higher compute capacity such that it has capability of performing some of the complicated simulation necessary to produce the three-dimensional object 414. In one scenario, because the compute capability of the device 402 might be sufficient, the server 404 may transmit the body model 410 and the item model 408 to the client device 402 such that a local physics engine 418 can render the three-dimensional object as it would appear on the body 414. An example engine 418 can include the SceneKit framework from APPLE® which includes a three-dimensional graphics component that enables the presentation of scenes based on descriptions of scenes in terms of geometry, materials, lights, and cameras including animation which can be rendered by describing changes to an object. A Javascript WebGL library 418 can be used on a client device 402 and can be implemented for rendering images. The key attributes can be configured for a particular type of framework on the client device 402. Again, depending on the different engines or rendering libraries 418 that are available on the client device 402, the server 404 will generate and transmit continuously certain data for showing the movement of the item on the specific body model.

When an asset 408/410 is transmitted to a client device 402, the rendering engine or the appropriate libraries can also be transmitted and installed 418 on the client device 402 for use in rendering the item 414. These libraries could be transmitted with initial key frames having full information about the item being modeled. The type of library that is transmitted could also vary based on what the request for rendering is. For example, if the user requests a model to raise his hands, a first type of client library could be transmitted with initial key frames which can be tuned or pre-tuned for rendering the motion requested. However, if the user requests the model to spin around or bend over or have added to it another accessory such as a necklace or an umbrella, then in response to that change request or modification, the system can transmit a second type of client library with initial key frames for the modified scene. In another aspect, the first library might be modified or tuned based on a new type of change request.

Having a physics engine 406 configured on the server 404 as well as a physics engine (or client library, etc.) 418 configured on the client device 402 can enable such features as balancing the rendering of shading. For example, the server physics engine 406 may simulate or generate the shading data for one or more frames of the scene. In another aspect, normals may be transmitted with wire-frame vertices on a frame by frame basis in which that data is processed by a client device physics engine 418 which will simulate the shading. The decision regarding which device to use for a shading calculation can depend on one or more factors such as respective device processing capability, bandwidth of communications between the devices, a perceived real-time requirement in connection with a current user, how many polygons need to be processed, and so forth. In one aspect, the server 404 may simulate shirt movement on a body model and a client device 402 may simulate pants movement in connection with a chair object in the scene. The different engines could coordinate which movement each respective engine will simulate.

In yet another aspect, parameters can be identified which can cause a hybrid approach. For example, the server 404 may predict that it will take 5 seconds to simulate the entire movement model for a particular item on the user's body. However, the system 404 can determine that the server 404 should generate every $4^{th}$ vertices of the wire-frame mesh and transmit that mesh to the client device, where the client device could then simulate the other vertices that are needed to provide the three-dimensional simulation 414. The system 404 could construct or simulate that portion of the body model and because the other portion of the body model to be simulated on the client device 402 such that the overall three-dimensional item simulation only takes two seconds or one second and is thus more responsive to user's request. In this regard, the system 404 is essentially sending a low-resolution image to the client device which then can continue to simulate other vertices in order to convert or transition the images to high resolution.

In order to balance processing between the client device 402 and the server 404, the server 404 can transmit one or more of metadata, the item model, the body model, other models, and so forth with the initial communication to the client device 402 or in a communication responsive to a change request. In another aspect, to speed up the responsiveness of the system to the change request or to a viewing request by the user, the system may not initially send an item model but only send the initial frames and then send the item model perhaps after 20 frames. When the client device has the item model as well as the user's body model, a physics engine on the client device can be used to simulate vertices or other data in a frame.

The decision points regarding a balancing of the computer processing between the client device 402 and the server 404, and regarding whether to transmit an item model to the client device 402 in order to enable local computer processing of some of the vertices in frames, can be evaluated as the client device 402 accesses the server 404. For example, if the client device 402 accesses a merchant website 404, and a query determines that the client device 402 has a relatively strong computing capability, the system may determine that part of the simulation can occur on a physics engine contained on the client 402. Thus, the adjustments that can be made by the server 404 can include one or more of generating a reduced resolution simulation on the server anticipating that the client device will perform some of the emulation of vertices, the transmission of one or more item or body models from the server 404 to the client device 402, the type of metadata transmitted to the client device 402, and so forth.

In another aspect, the system may determine that certain strategic vertices will be computed on the server 404 while more simple vertices are computed on the client device 402. Vertices that represents strategic or change points such as elbows or areas in clothing where there are many folds can be determined to be above a threshold value in terms of complexity or importance in terms of the overall clothing structure and can be determined to be computed on the server 404 or on the client device 402. Simulating every other vertices on the server 404 is a simple way of dividing up the processing between the server 404 and the client device 402. While other configurations (like generating every third or fourth vertices on the server) may be more complicated to manage, such approaches may ultimately be more efficient in terms of how to balance the processing between server 404 and client 402.

In one aspect, a particular region of an item of clothing on the body model might not have many folds. The server 404 can simply instruct the client device 402 to present generic rendering of polygons in that that region. Such an approach can give the user the impression that they are seeing a high resolution image even though in some scenarios they may not be viewing a high resolution image. The actual image may be a simple rendering of certain regions of clothing which do not have a complicated structure.

In yet another aspect, a pre-stage simulation as noted above could also occur on the user's client device 402. As the user interface, such as is shown in FIG. 3, is presented on the client device 402, the server 404 could also pass the item model 408 and the body model 410 to the client device 402 such that initial simulations could begin to be processed. For example, if the user has the option of changing a short sleeve shirt to a long-sleeve shirt 420, and the user is viewing a short sleeve shirt 414 as is shown in FIG. 4, the client device 402 can be instructed to begin simulating a long-sleeve shirt model in preparation for the user selecting that option.

In another aspect, real-world issues can arise in connection with the principles described above. For example, a user may request a change or request specific movement 420 in their presented stimulation only to experience connectivity issues with a network such that either the instruction is not sent to the back-end server 404 or the simulated frames are not received. In one respect, the physics engine simulation 412 can include momentum information regarding individual particles or vertices. In a scenario where some frames have been sent to the client device 402 and then a connectivity issue causes a loss of the reception of additional frames, the momentum information that is sent in at least one or more frames can be used 418 to predict on the client side 402 the next frame movement. The client device 402 can actually gloss over or simulate that movement where such frames are not received from the network server. A local physics engine 418 can perform this prediction and rendering.

In one example, when connectivity is interrupted, the client device 402 could use the momentum data to bring the object 414 to a natural stopping position using the momentum data. In another aspect, where the connectivity interruption occurs, the system may use previous frames to bring the animation 414 back to an original position in a natural way. The user in this regard may not notice a lack of connectivity as the model may still be moving in a reverse pattern that might not be recognizable by the user. The client device 402 may determine between different disconnect strategies depending on one or more of the type of motion that has already been exhibited, the natural characteristics of moving to an ending position relative to a current position, or other factors. For example, if the previous movement was random or of a type that, if reversed, would look natural or not unusual to the user, the client device 402 could simply reverse the movement back to the original position. However, that might not be acceptable in all scenarios where such reversed movement would be unnatural. In such a case, the system may simulate or gloss over the lack of data and bring the object to a stopping point that is more expected and natural. The system could also repeat instructions as well depending on the type of movement that is being rendered.

In one aspect, in a disconnect scenario, the physics engine 418 on the client device 402 may be initiated and the body model 410 and/or the item model 408 may be accessed to continue with the frame by frame simulation picking up where the last frame was received from the server 404. In order to prepare for such a scenario, it is assumed that the client device 402 has the item model 408 and the body model 410 or at least a version of the models. The server 404 at some point may download these models automatically or based on potential connectivity issues that are predicted, based on a manual request, or in some other scenario.

Client device 430 represents a device that does not have a local rendering module 418. Client device 430 can represent either an older device, or a less expensive device with less processing capability for local rendering. In this case, the capabilities of the device can be transmitted 432 to the server 404. The data regarding the rendering capabilities of the client device 430 can be provided to the physics engine 406 which can then generate a three-dimensional data tailored for that device 430. Thus, the physics engine 406 in this case could transmit full images or video data 434 which are merely presented on the display of the client device 430 without local rendering. The physics engine 406 and/or server 404 might make other decisions based on the lack of local rendering capability on the client device 430. For example, the server 404 might request expanded processing capability from other servers or virtual machines in order to quickly generate full frames of data for transmission to the client device 430. Additional network bandwidth might be requested for a brief period of time to transmit a batch of data to the client device 430 for buffering and playback. A frame rate might be adjusted recognizing that the client device 430 will merely display each frame rather than performing local rendering for each respective frame.

Figure 5A:
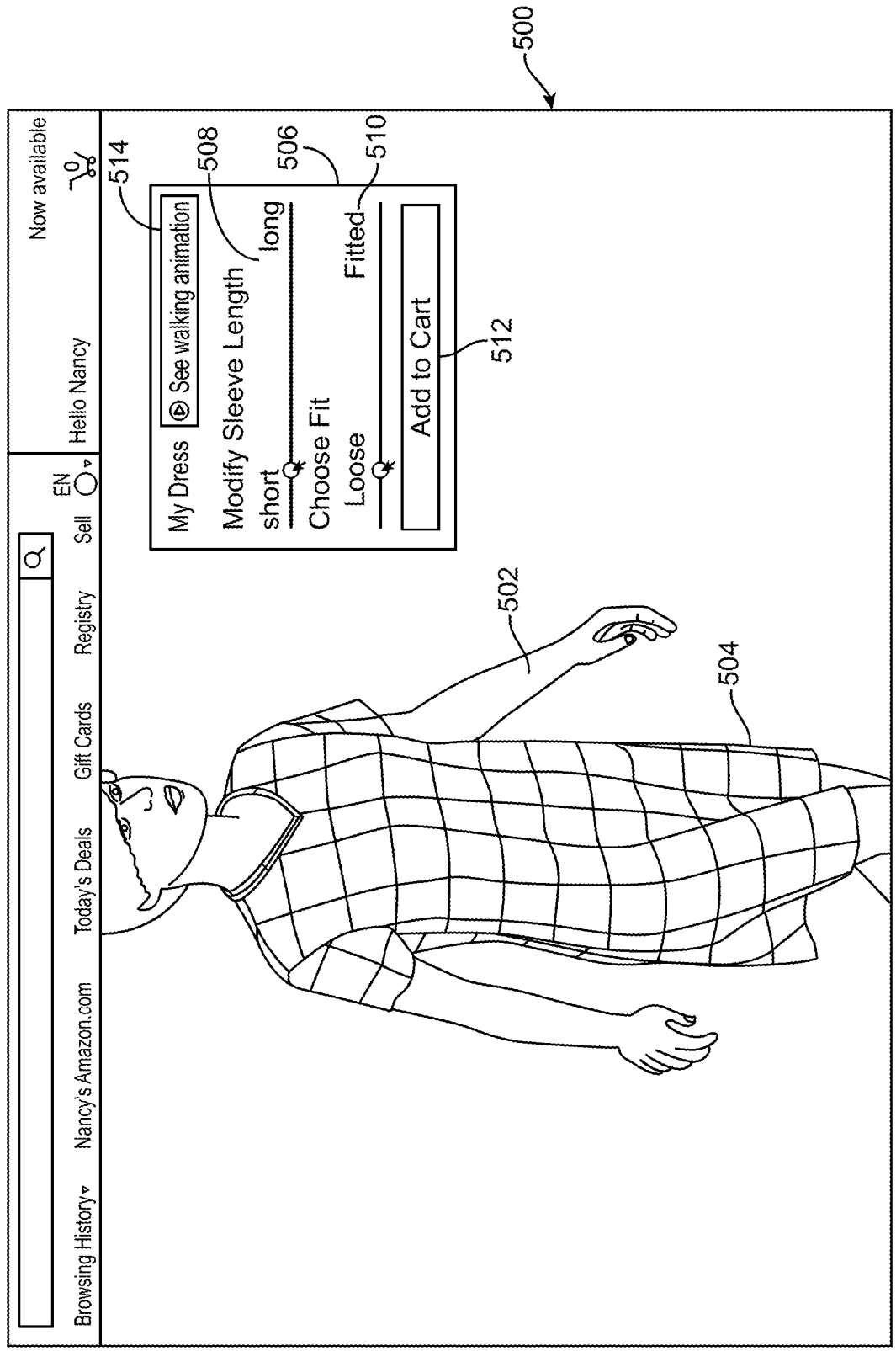
FIGS. 5A-5C illustrate examples of real-time visualization updates.
Figure 5B:
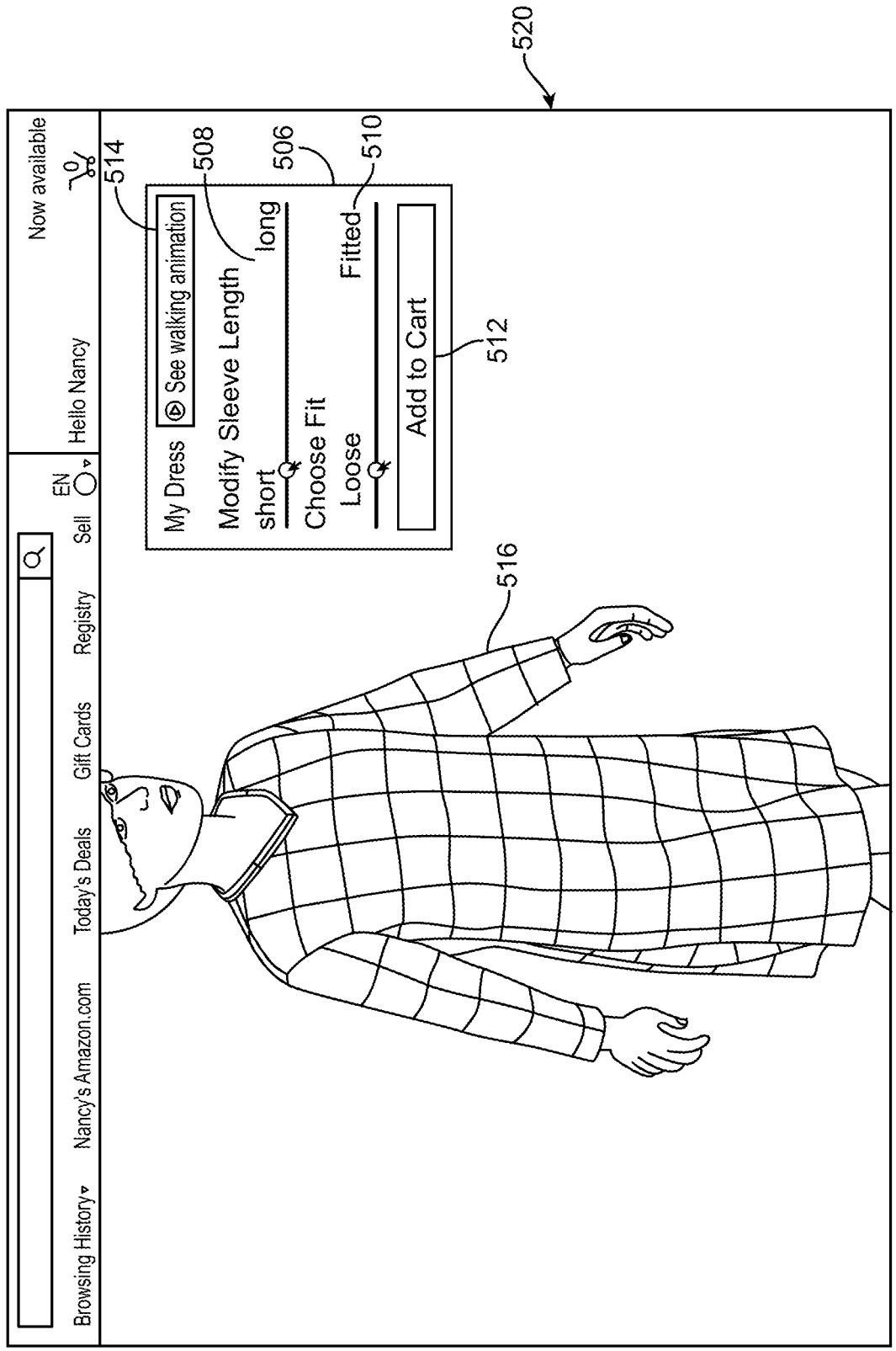
Figure 5C:
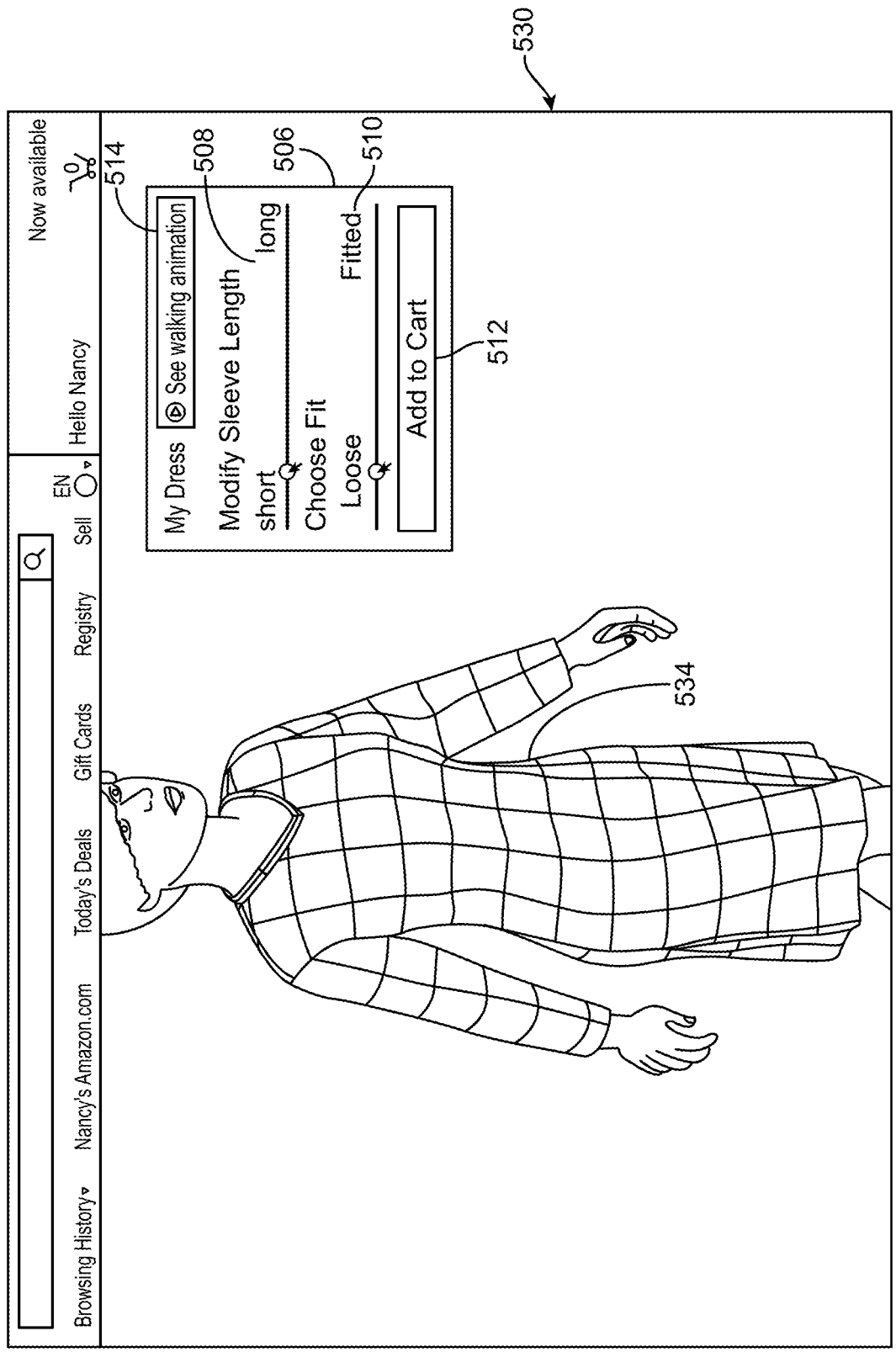

FIGS. 5A-5C illustrate a change instruction showing more details about the three-dimensional item on the user's body model. FIG. 5A shows an interface 500 with the body model 502 of the user and an illustrated dress 504 which is short sleeve. A selection interface 506 is presented to the user where they can make changes. For example, feature 508 represents the opportunity to modify the sleeve length of the dress. A slide bar is shown which enables the user to choose on a granular scale the sleeve length. The option could also be simply a long sleeve or short sleeve option. The option currently shown is that the sleeves a relatively short. Another option 510 shows the option to choose either loose fit or a fitted fit, which can also be presented as a slide bar or selecting in a granular nature of the type of fit. The current option is a loose fit. Feature 512 enables the user to add the dress to a cart for purchasing. A sliding scale could also be used to make adjustments to the body model, such as adding pounds or subtracting pounds or making the person taller.

The user can have an option 514 to view the model walking. The graphical representation 514 could also enable a drop down menu or other type of menu in which the user can see the model jumping, running, raising arms, lifting legs, bending over, and so forth. The user could request to see any of these types of movements in a simulated video.

FIG. 5B illustrates an interface 520 and how the user might select the long sleeve option. The system responds with a simulation of the long sleeve option and the user can see how the dress 516 now has long sleeves. The interface 506 is shown to adjust based on the user input to request longer sleeves 514.

FIG. 5C illustrates yet another interface 530 in which the user maintains the option of a long sleeve for the dress 514 in the interface 506 but selects the fitted option 532 which causes the dress to tighten around the waist 534. These visualization updates can be performed in real-time or near real-time and typically in less than 2 seconds. As noted above, the processing of the updated simulation can occur either entirely on a server or entirely on the client device or as a hybrid or combination thereof.

It is again noted that while this interface illustrates how the user might tailor a particular garment, that the interface could also provide additional options such as adding wind, making the garment wet, adding other items such as a floor, wall, ceiling, furniture, or any other item which can interact with the item of interest.

The data transmitted from a server 404 to a client device 402 can be compressed using any data compression technique. For example, the data representing the vertices to be transmitted to the client device can be converted to Base64 and streamed to the client device. This enables the final file size to be about 10-20% of the original file size. As is known in the art, Base64 is an encoding scheme that encodes binary data by treating it numerically and translating it into a Base64 representation. The particular compression technique can vary depending on the desired level of compression. Particular compression scheme can also be selected and implemented by the server based on the client device capabilities, the change requests, the amount of data, available bandwidth, responsiveness desired, etc.

The server 404 can include one or more processing components, such as a computer processing unit (CPU) and a graphics processing unit (GPU). The graphics engine 406 can access one or both of the CPU or the GPU for running the algorithm for generating the data to be transmitted to the client device.

Figure 6A:
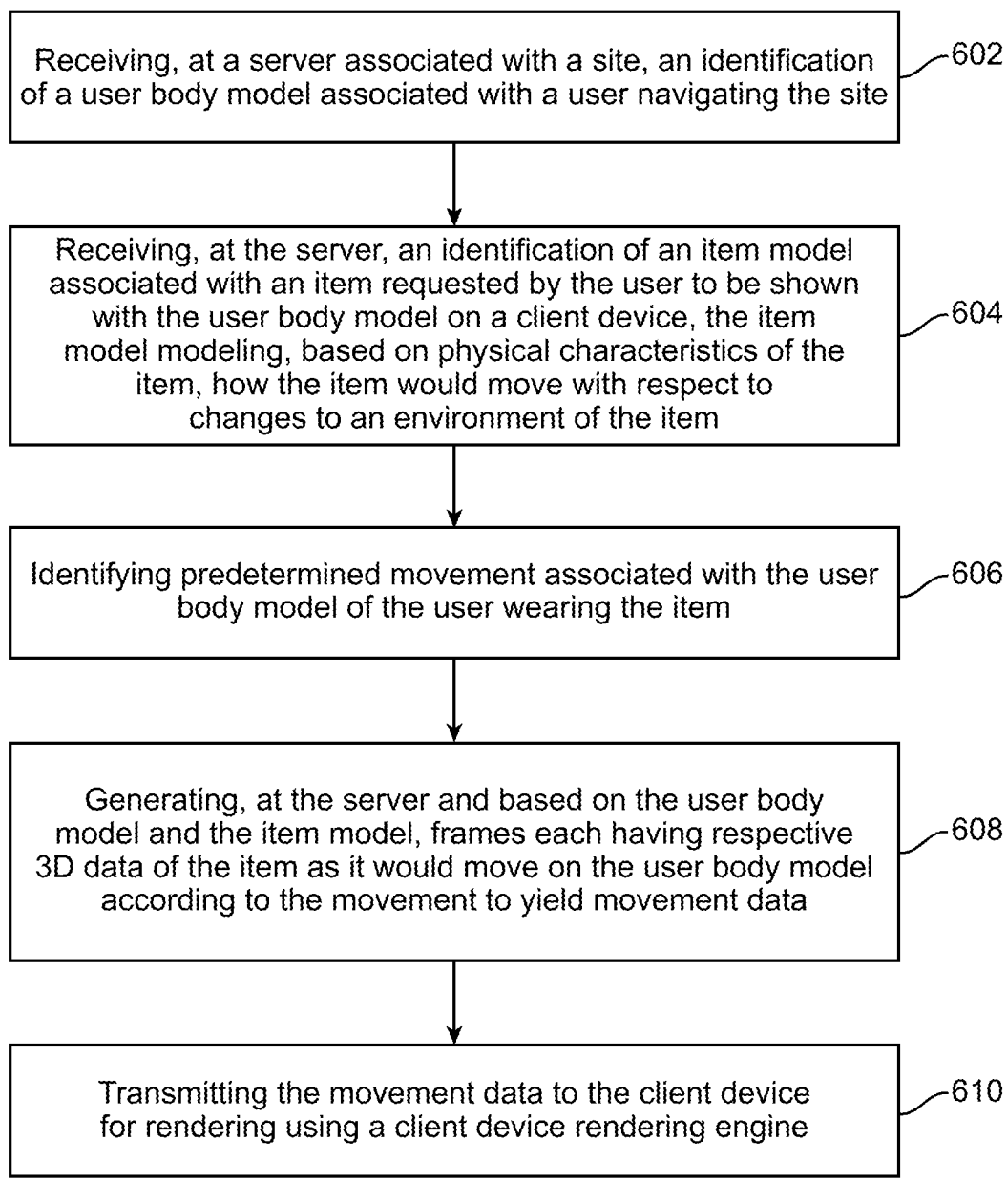
FIGS. 6A-6C illustrate example methods.
Figure 6B:
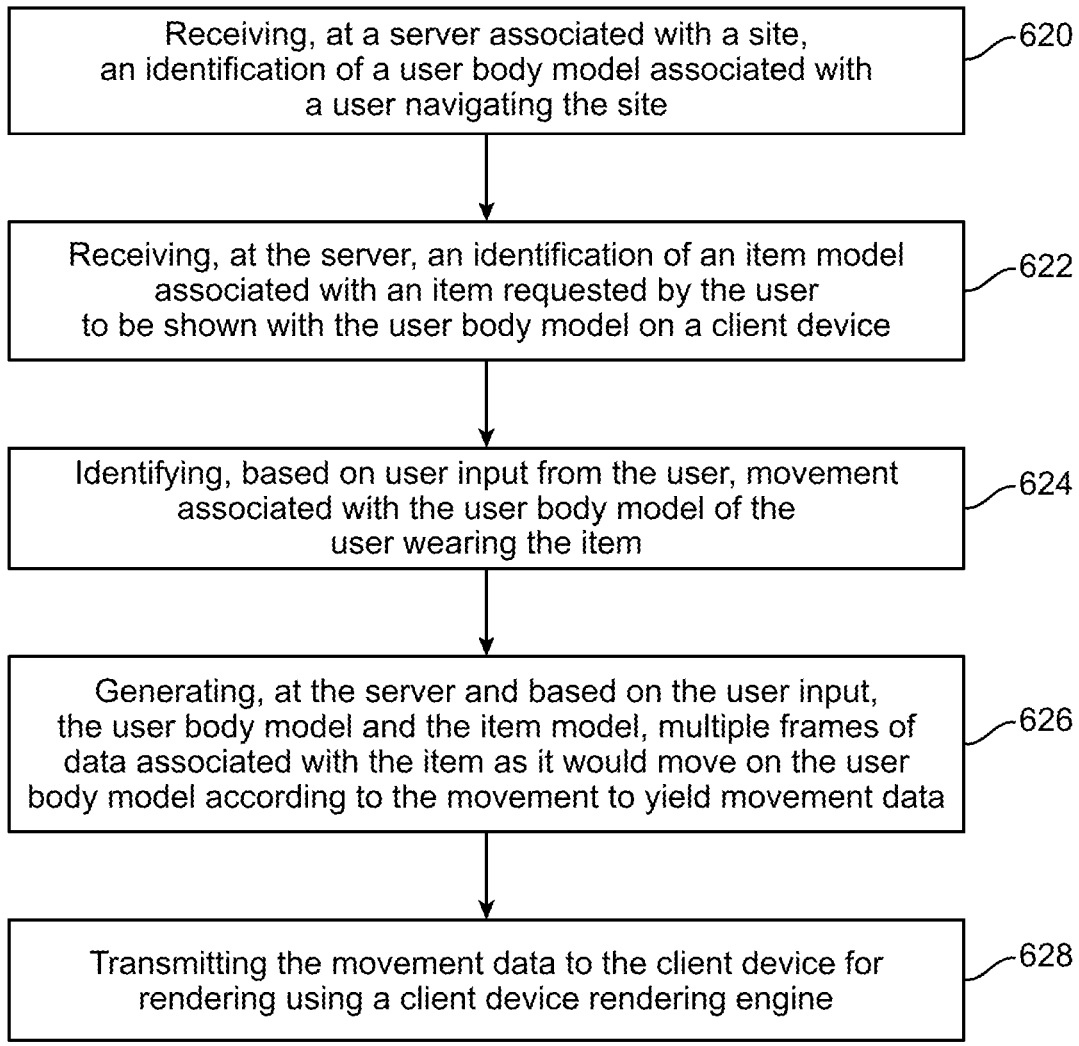
Figure 6C:
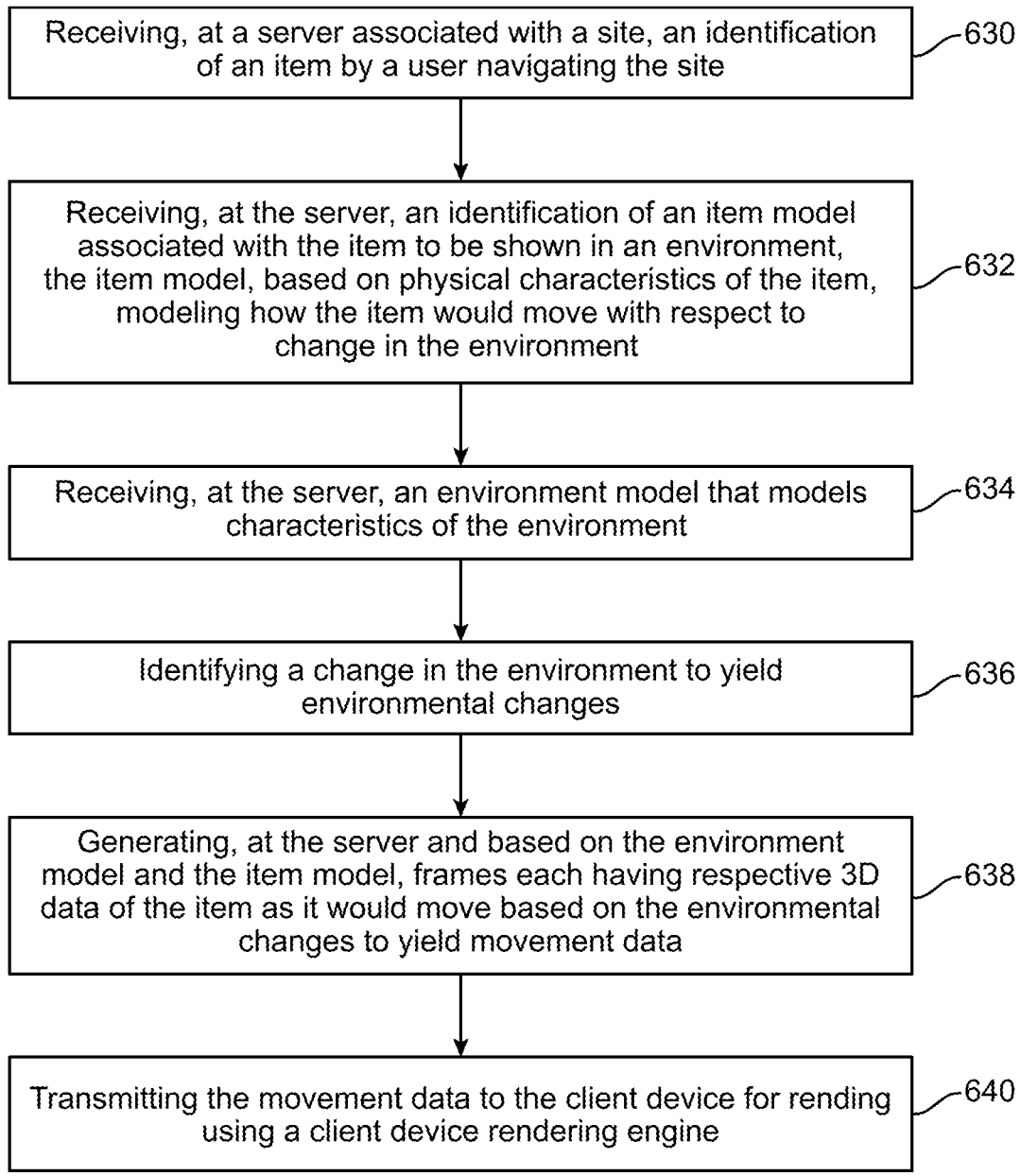

FIGS. 6A-6C illustrate various example methods. FIG. 6A focuses on an aspect of this disclosure related to body models and to a predetermined movement of an item to show a user. As shown in FIG. 6A, a method can include receiving, at a server operating a site, an identification of a body model associated with a user navigating the site (602), receiving, at the server, an identification of an item model associated with an item requested by the user to be shown with the body model on a client device, the item model modeling, based on physical characteristics of the item, how the item would move with respect to changes to an environment of the item (604) and identifying movement associated with the body model of the user wearing the item (606). A practical example of this approach can include a user navigating to a merchant website or a merchant site on the mobile device in which the user desires to view an item of clothing or potential purchase. A server operating the site or associated with the site can identify the body model of the user or other type of model and receive an identification of the clothing item and a clothing item model which will be used to model how that item would look in connection with the chosen body model.

As noted above, the body model discussed in FIG. 6A could also represent any other model such as a wind model, item model, moisture model, floor model, scene model, and so forth. Any item which can produce a force which acts on or interacts with the item of interest can be modeled. The system can identify predetermined movement associated with that respective model. For example, if the item is a glass, and the other model is a model of the floor, the system would utilize a glass model which would take into account the physical characteristics of the glass and gravity and how the glass would break as it strikes the floor if a person were to drop the glass. The floor model could relate to the physical characteristics of the floor, such as whether it is a stone, carpet, dirt, and so forth. The system could store predetermined movement and breaking patterns of the glass in this example.

In another example, the system could identify predetermined movement associated with an item such as wind as it would impact an item of clothing. The item model in this example could be the clothing model and a second model for the wind could be used to generate predetermined movement of an item of clothing when impacted by the wind. In this scenario, the predetermined movement can be generally focused on the movement of the item when impacted by a force of another item or object. The other item or object can be a body, wind, another piece of clothing, a piece of jewelry, and so forth. The system can store a series of predetermined movement of the item based on these various sources of force or interaction with the item of interest.

The method can further include generating, at the server and based on the body model and the item model, frames each having respective three-dimensional data which can include vertices points of the item as it would move on the body model according to the movement to yield movement data (608) and transmitting the movement data to the client device for rendering using a client device rendering engine (610). The predetermined movement can be chosen based on a user profile, a type of item such as address or shirt or jewelry, characteristics of the body model, a movement history chosen by the user, and so forth. When the movement is user-requested movement as is discussed more below, the method can include generating the frames each having respective three-dimensional data of the item as it would move on the body model according to the movement and transmitting the movement data to the client device for rendering using a client device rendering engine. These steps can be performed in real-time and in response to the user-requested movement.

In another aspect, generating the frames each having respective key attributes of the item as it would move on the body model according to the movement and transmitting the movement data to the client device for rendering using a client device rendering engine are performed frame by frame as the server generates each respective frame. The server can generate each frame and transmit each frame as it is generated to the client device to give the user a more real-time experience in seeing the movement of the item on the body model as soon as they request the movement or in an imperceptible or very short amount of time following the request for movement.

FIG. 6B illustrates another example method. In this example, the method includes receiving, at a server operating a site, an identification of a user body model associated with a user navigating the site (620), receiving, at the server, an identification of an item model associated with an item requested by the user to be shown with the user body model on a client device (622), identifying, based on user input from the user, movement associated with the user body model of the user wearing the item (624), generating, at the server and based on the body model, the user input and the item model, multiple frames of in three-dimensions associated with the item as it would move on the body model according to the movement to yield movement data (626) and transmitting the movement data to the client device for rendering using a client device rendering engine (628). As can be appreciated, this embodiment focuses on the real-time change requests from a user to see how a particular item such as a shirt would move based on forces from a source such as the body, wind, other items of clothing, and so forth.

The movement data can include at least a portion of vertices points used by the client device rendering engine to render the item on the body model. Generating the data in three-dimensions can include generating frames containing at least the movement data for viewing on the client device. Generating the data in three-dimensions of the item as it would move on the body model according to the movement can be performed in real-time by the server (according to its physical capabilities and network availability) and in response to a request from the user identifying the movement or the changes to the virtual environment.

In one example, the user may be causing an avatar in a gaming environment to walk from room to room. The change in rooms can represent the input from the user and the generation of multiple frames of data associated with the item can also include the development of frames based on a new set of different environmental models which can include body movement, moisture, humidity, wind, other items in a room, and so forth.

The request from the user identifying the movement can include a frame request generated at the client device and transmitted to the server for generating a number of frames to illustrate the movement of the item on the body model. The number of frames that would be included within request, in one aspect, is generated by the client device or generated at the server. For example, the user might cause the arm of the body model to be raised or request of the body model spin, run or jump to illustrate the movement of a dress.

Each respective movement will involve one or more frames for rendering. The server can receive a movement identification as well as a request for a number of frames. The physics engine may then begin to generate frames in an iterative fashion and the server can begin to transmit frames to the client device. The server may choose different physics engines or may take different processing steps based on the number of frames requested. For example, if a large number frames as requested, and to enable a more real-time experience for the user, the server may access or utilize more processing power, or a more simplified physics engine, or perform parallel processing if possible in order to provide a more real-time response to the user's request for movement. Different physics engines can have different characteristics of affinities for different types of movement or modeling and the server can select which physics engine to apply depending on a number of factors. Multiple physics engines might be deployed simultaneously for a single simulation. They each may generate frames which are then concatenated together at the client device.

The method can further include, at the server, in real-time and based on the frame request: generating the three-dimensional data frame by frame to yield a series of frames and transmitting, to the client device, a respective frame of the series of frames as the respective frame is generated. Generating the three-dimensional data of the item as it would move on the body model or in connection with other forces according to the movement can be performed in response to the movement request from the user. Transmitting the movement data to the client device for rendering using a client device rendering engine can be performed frame by frame as the server generates frames associated with the movement. Transmitting the movement data to the client device for rendering using the client device rendering engine can further include, upon a generation of each respective frame comprising respective data, transmitting the respective frame to the client device. In this regard, the physics engine will typically operate in a loop and generate successive frames. Each respective frame that is generated immediately can be transmitted to the client device. In one aspect, each respective frame includes one of vertices positions or a change in vertices positions from a previous frame for rendering a final frame by the client device rendering engine.

FIG. 6C illustrates another example method which illustrates the broader concept of an environmental model rather than a body model specifically. The method includes receiving, at a server associated with a site, an identification of an item by a user navigating the site (630), receiving, at the server, an identification of an item model associated with the item to be shown in an environment, the item model, based on physical characteristics of the item, modeling how the item would move with respect to change in the environment (632), receiving, at the server, an environment model that models characteristics of the environment (634), identifying a change in the environment to yield environmental changes (636), generating, at the server and based on the environment model and the item model, frames each having respective three-dimensional data of the item at it would move based on the environmental changes to yield movement data (638) and transmitting the movement data to the client device for rending using a client device rendering engine (640). The the environment model can model physical characteristics of an environment, such as modeling wind as particles moving from a source location to a shirt and impacting on the shirt. The physical characteristics can be how hard a floor is, or where a table is and what the table is made from.

Figure 7:
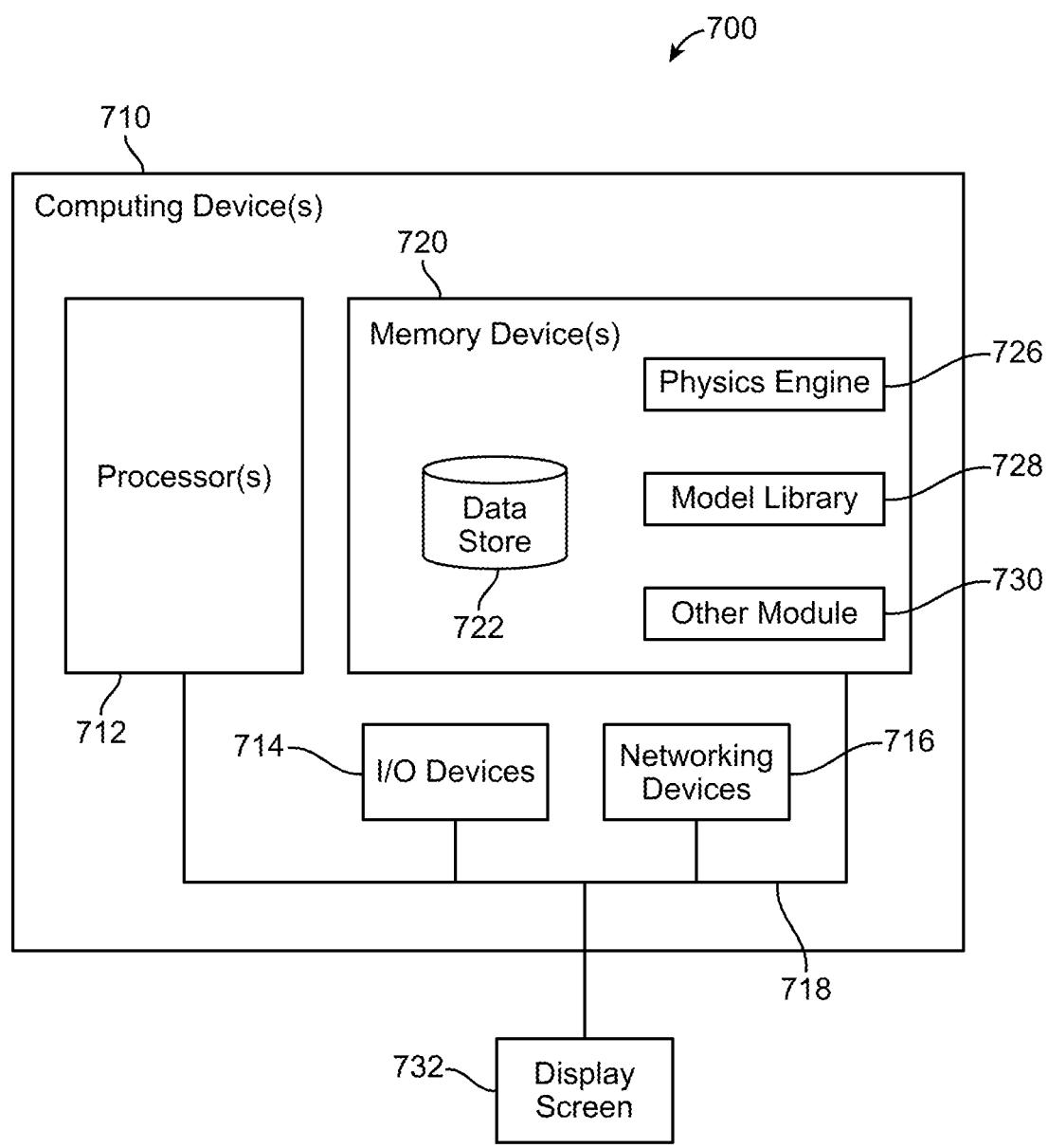
FIG. 7 illustrates an example system.

FIG. 7 illustrates a system 700 including a computing device 710 on which modules 726, 728, 730 of this technology may execute. A computing device 710 is illustrated as a high level example of the hardware infrastructure used in connection with software modules or for performing the functions disclosed herein. The computing device 710 may include one or more processors 712 that are in communication with memory devices 720. The computing device 710 may include a local communication interface 718 for the components in the computing device. For example, the local communication interface 718 can be a local data bus and/or any related address or control busses as may be desired.

The memory device 720 may contain modules that are executable by the processor(s) and data for the modules. Located in the memory device 720 are modules executable by the processor. For example, a physics engine or simulation model 726, a library 728 which can store models, profiles, simulations, or other data, and an "other" module 730, may be located in the memory device 720. A data store 722 may also be located in the memory device 720 for storing data related to the modules and other applications along with an operating system that is executable by the processor(s) 712. Each module represents a combination of software programming and one or more hardware components to carry out program steps and does not encompass a signal per se.

The computing system 710 of FIG. 7 may represent either a server or a client device, either of which can have a physics engine 726. For example, the physics engine 726 can be used to generate the key attributes or other simulation data and frames disclosed herein in whole or in part. The library 728 can represent storage of different model types as well as scenes, pre-determined model simulations, predetermined movement patterns, and so forth. The other module 730 can represent other component or modules that might be used in connection with the physics engine 726 for generating data for transmission to client devices. For example, the "other" module 730 can be programmed to combine an avatar model with a user's body model to generate a modified avatar body model that embodies some characteristics of the user, which modified body model can then be used by the physics engine to simulate clothing for a game.

The computing device 710 may further include or be in communication with a device 732, which may include a display device or other computing device. The device 732 may be available for an administrator to use in interfacing with the computing device 710, such as to review operation of the system, modify the system, make improvements to the system and so forth.

Various applications may be stored in the memory device 720 and may be executable by the processor(s) 712. The processor can include multiple processors and/or a graphics processing unit. Components or modules discussed in this description that may be implemented in the form of software using high programming level languages that are compiled, interpreted or executed using a hybrid of the methods. Any component can be a virtual component as well.

The computing device 710 may also have access to I/O (input/output) devices 714 that are usable by the computing devices. An example of an I/O device 714 is a display screen 732 that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network. I/O devices 714 can include or represent any kind of multimodal or alternate mode input by a user, such as speech, haptic, biometric, visual, graffiti, and so forth.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

Some of the functional units described in this specification have been labeled as modules, in order to more particularly emphasize their implementation independence. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, include one or more blocks of computer instructions, which may be organized as an object, procedure, or function. Nevertheless, the executables of an identified module need not be physically located together, but may include disparate instructions stored in different locations which include the module and achieve the stated purpose for the module when joined logically together.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium or device that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application. A computer-readable media or device does not constitute a signal per se independent of any hardware component.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended.

Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Embodiments of this disclosure can be claimed from the standpoint of any component disclosed herein. For example, while the focus on the above disclosure is on graphical or physics simulations, other computationally expensive simulations could also occur. For example, some home devices are developed for voice interaction. Users provide voice instructions for taking specific actions such as listening to music, ordering a product, or controlling a household feature. Where real-time simulations might be desirable, the principles disclosed herein could also apply to simulate sound or other data different from graphical data.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
   receiving, at a server operating a site, an identification of a dynamic environment model associated with a user navigating the site, the dynamic environment model modeling both physical characteristics of at least a human body and air currents in an environment associated with the site;
   receiving, at the server, an identification of an item model associated with an item requested by the user to be shown with the dynamic environment model on a client device, the item model modeling, based at least on physical characteristics of the item, how the item would adjust in connection with a change in the environment;
   receiving, at the server, first information representing rendering capabilities of the client device;
   receiving, at the server, second information representing the dynamic environment model as viewable on the client device;
   identifying movement or change associated with the environment;
   generating rendering data at the server, the rendering data comprising frames with at least key attributes, shading data, texture data and viewable vertices points of the item, wherein the rendering data is generated based at least on:
   the second information,
   the first information,
   the movement or the change,
   the dynamic environment model, and
   the item model; and
   transmitting the rendering data to the client device, wherein the client device renders the rendering data using a client device rendering engine.

2. The method of claim 1, wherein the dynamic environment model comprises a user body model of the user, wherein the movement or change is associated with the user body model of the user wearing the item, and wherein the movement or change is one of predetermined movement or user-requested movement.

3. The method of claim 1, wherein, when the movement or change is user-requested movement, generating the rendering data is performed continuously and in response to user-requested movement.

4. The method of claim 3, wherein generating the rendering data is performed frame by frame as the server generates each respective frame of the rendering data.

5. A method comprising:
   receiving, at a server operating a site, an identification of a user;
   identifying a dynamic environmental model associated with an environment presented on the site, the dynamic environmental model modeling both physical characteristics of at least a human body and air currents in the environment;
   receiving, at the server, an identification of an item requested by the user to be shown in connection with the environment on a client device;
   identifying an item model associated with the item;
   identifying a change associated with the environment;
   receiving, at the server, first information representing rendering capabilities of the client device;
   receiving, at the server, second information representing the dynamic environment model as viewable on the client device;
   generating rendering data at the server, wherein the rendering data includes at least viewable vertices points of the item, and wherein the rendering data is generated based at least on:
   the second in formation,
   the first information,
   the change,
   the dynamic environmental model, and
   the item model, the rendering data representing the item as the item would move in connection with the dynamic environmental model according to the change; and
   transmitting the rendering data to the client device, wherein the client device renders the rendering data using a client device rendering engine.

6. The method of claim 5, wherein the rendering data comprises at least a portion of the viewable vertices points used by the client device rendering engine to render the item with the dynamic environmental model.

7. The method of claim 5, wherein generating the rendering data comprises generating frames containing at least the rendering data for viewing on the client device.

8. The method of claim 5, further comprising receiving, at the server, a request identifying the change, wherein generating the rendering data is performed continuously at the server in response to the request identifying the change.

9. The method of claim 8, wherein the request identifying the change comprises a frame request for generating a number of frames to illustrate the change of the item relative to the dynamic environmental model.

10. The method of claim 5, further comprising receiving, at the server, a frame request, wherein:
in response to the frame request, the rendering data is generated frame by frame to yield a series of frames, and
transmitting the rendering data to the client device comprises transmitting a respective frame of the series of frames to the client device as the respective frame is generated.

11. The method of claim 5, wherein transmitting the rendering data to the client device is performed frame by frame as the frames are generated at the server.

12. The method of claim 5, wherein the environment further comprises one or more of an item of clothing, wind, a ground, an accessory, an object in a scene which comprises the item, and a room characteristic of a room comprising the item.

13. The method of claim 5, further comprising receiving, at the server, a change request, wherein the dynamic environmental model comprises a body model for the user, and wherein generating the rendering data is performed in response to the change request.

14. The method of claim 5, wherein transmitting the rendering data to the client device further comprises, upon a generation of each respective frame comprising respective key attributes, transmitting the respective frame to the client device.

15. The method of claim 14, wherein each respective frame comprises one of vertices positions or a change in vertices positions from a previous frame for rendering a final frame by the client device rendering engine.

16. A system comprising:
a processor; and
a computer-readable storage device storing instructions which, when executed by the processor, cause the processor to perform operations comprising:
receiving an identification of a dynamic environmental model associated with a user navigating a site, the dynamic environmental model modeling both physical characteristics of at least a human body and air currents in an environment;
receiving an identification of an item model associated with an item requested by the user to be shown in connection with the environment on a client device;
receiving first information representing rendering capabilities of the client device;
receiving second information representing the dynamic environment model as viewable on the client device;
identifying movement associated with the dynamic environmental model and the item;
generating rendering data, wherein the rendering data includes at least viewable vertices points of the item, and wherein the rendering data is generated based at least on:
the second information,
the first information,
the movement,
the dynamic environmental model, and
the item model; and
transmitting the rendering data to the client device, wherein the client device renders the rendering data using a client device rendering engine.

17. The system of claim 16, wherein the rendering data comprises one or more of key attributes, a subset of vertices needed for rendering, a full set of vertices needed for rendering, image data and video data.

18. The system of claim 16, wherein the movement associated with the dynamic environmental model and the item is one of predetermined movement or user-requested movement.

19. The system of claim 16, wherein, when the movement is user-requested movement, generating the rendering data is performed continuously and in response to the user-requested movement.

20. The system of claim 16, wherein the dynamic environmental model comprises a body model and wherein generating the rendering data is performed frame by frame as the system generates each respective frame.

* * * * *

UNITED STATES PATENT AND TRADEMARK OFFICE
CERTIFICATE OF CORRECTION

PATENT NO. : 11,308,687 B1
APPLICATION NO. : 16/370078
DATED : April 19, 2022
INVENTOR(S) : Nancy Yi Liang It is certified that error appears in the above-identified patent and that said Letters Patent is hereby corrected as shown below:

In the Specification

Column 11, Line 30, delete "the a" and insert -- the --.

Column 21, Line 12, delete "that that" and insert -- that --.

Column 26, Line 27, delete "The the" and insert -- The --.

In the Claims

Column 30, Line 48, Claim 5, delete "in formation," and insert -- information, --.

Signed and Sealed this
Twenty-fifth Day of October, 2022

Katherine Kelly Vidal
*Director of the United States Patent and Trademark Office*